(12) United States Patent
Coronella et al.

(10) Patent No.: US 10,377,954 B2
(45) Date of Patent: Aug. 13, 2019

(54) METHOD FOR WET TORREFACTION OF A BIOMASS

(75) Inventors: Charles J. Coronella, Reno, NV (US); Wei Yan, Memphis, TN (US); Mohammad Toufiqur Reza, Reno, NV (US); Victor R. Vasquez, Reno, NV (US)

(73) Assignee: Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 284 days.

(21) Appl. No.: 13/223,562

(22) Filed: Sep. 1, 2011

(65) Prior Publication Data

US 2012/0110896 A1 May 10, 2012

Related U.S. Application Data

(60) Provisional application No. 61/411,661, filed on Nov. 9, 2010, provisional application No. 61/480,813, filed on Apr. 29, 2011.

(51) Int. Cl.
*C10L 9/08* (2006.01)
*C10L 5/44* (2006.01)
(Continued)

(52) U.S. Cl.
CPC .................. *C10G 1/02* (2013.01); *C10L 1/02* (2013.01); *C10L 5/143* (2013.01); *C10L 5/363* (2013.01);
(Continued)

(58) Field of Classification Search
USPC .......................................... 44/307, 605, 606
See application file for complete search history.

(56) References Cited

U.S. PATENT DOCUMENTS 5,095,825 A * 3/1992 Arpalahti .................. B01J 3/02
110/101 C
2008/0006518 A1* 1/2008 Shimojo et al. ................ 201/20
(Continued)

FOREIGN PATENT DOCUMENTS

WO 2010006881 A1 1/2010

OTHER PUBLICATIONS

Wei Yan, Tapas C. Acharjee, Charles J, Coronella, and Victor R. Vasquez, Thermal Pretreatment of Liugnocellulosic Biomass, Aug. 2009. Wiley Interscience (www.interscience.wiley.com), 435-440.*

(Continued)

*Primary Examiner* — Ellen M McAvoy
*Assistant Examiner* — Ming Cheung Po
(74) *Attorney, Agent, or Firm* — Schwabe Williamson & Wyatt, P.C.

(57) ABSTRACT

A process for increasing the energy density of a biomass, which includes establishing a temperature and pressure within a reaction chamber that includes water and is at or above a desired reaction condition wherein the desired reaction condition is sufficient to increase the energy density of a reacted biomass; introducing a biomass into the reaction chamber such that the desired reaction condition is maintained or equilibrates thereto; and subjecting the biomass to the desired reaction condition for an amount of time effective to increase the energy density of the reacted biomass relative to the biomass prior to reaction.

19 Claims, 14 Drawing Sheets

(51) Int. Cl.
  *C10G 1/02* (2006.01)
  *C10L 1/02* (2006.01)
  *C10L 5/14* (2006.01)
  *C10L 5/36* (2006.01)
(52) U.S. Cl.
  CPC .............. *C10L 9/083* (2013.01); *C10L 9/086* (2013.01); *C10G 2300/1011* (2013.01); *C10J 2300/0909* (2013.01); *Y02E 50/15* (2013.01); *Y02E 50/30* (2013.01); *Y02P 30/20* (2015.11)

(56) References Cited

U.S. PATENT DOCUMENTS

| | | | | |
|---|---|---|---|---|
| 2009/0084029 | A1* | 4/2009 | Bergman | C10B 53/02 44/605 |
| 2009/0151251 | A1* | 6/2009 | Manzer | C07C 29/1516 48/197 R |
| 2009/0250331 | A1* | 10/2009 | Hopkins | C10B 47/44 201/6 |
| 2010/0184176 | A1 | 7/2010 | Ishida et al. | |
| 2010/0270505 | A1* | 10/2010 | Gallaspy | C01B 3/34 252/373 |
| 2011/0056125 | A1* | 3/2011 | Antonietti | 44/605 |
| 2011/0271588 | A1* | 11/2011 | Schendel et al. | 44/605 |
| 2014/0208995 | A1* | 7/2014 | Olofsson | F26B 23/022 110/222 |

OTHER PUBLICATIONS

Wei Yan, Tapas Acharjee, M. tougiq Reza, Charles Coronella, Victor Vasquez, Wet Torrefaction of Lignocellulosic Biomass, Sep. 22, 2010, https://www.dri.edu/images/stories/editors/receditor/Coronella.pdf, pp. 4.*
Wei Yan et al. Thermal Pretreatment of Lignocellulosic Biomass, Aug. 2009, Environmental Progress and Sustainable Energy, vol. 28, No. 3, 435-440.*
Yan et al., Thermal Pretreatment of Lignocellulosic Biomass, Aug. 2009, Environmental Progress and sustainable Energy, vol. 28, No. 3, 435-440.*
Yan et al., Thermal Pretreatment of Lignocelluloosic Bimoass, Aug. 2009, Envrionmental Progress and Sustainable Energy, vol. 28, No. 3, 435-440.*
Dragan, Knezevic, Hydrothermal Conversion of Biomass, 2009, Printpartners, 104-112.*
Yan et al., Thermal Pretreatment of Lignocelluloosic Bimoass, Aug. 2009, Envrionmental Progress and Sustainable Energy, vol. 28, No. 3, 435-440 (Year: 2009).*
Yan et al., Thermal Pretreatment of Lignocelluloosic Bimoass, Aug. 2009, Envrionmental Progress and Sustainable Energy, vol. 28, No. 3, 435-44 (Year: 2009).*
Yan et al., Thermal Pretreatment of Lignocellulosic Biomass, Aug. 2009, Environmental Progress and Sustainable Energy, vol. 28, No. 3, 43-44 (Year: 2009).*
Dragan Knezevic, Hydrothermal Conversion of Biomass, 2009, Printpartners, 104-112 (Year: 2009).*
Yan, Wei, et al., Thermal Pretreatment of Lignocellulosic Biomass, Environmental Progress & Sustainable Energy, Oct. 2009, pp. 435-440, vol. 28, No. 3, American Institute of Chemical Engineers.
Yan, Wei, et al., Mass and Energy Balances of Wet Torrefaction of Lignocellulosic Biomass, Energy & Fules, American Chemical Society, published on Feb. 10, 2010 at 24 (9), pp. 4738-4742.
Curtis, R.G., et al., Equilibria in Furfural-Water Systems Under Increased Pressure and the Influence of Added Salts Upon the Mutual Solubilities of Furfural and Water, NASA Astrophysics Data System, pp. 212-235,CSIRO Australia.
Funke, Alex, et al., Hydrothermal Carbonization of Biomass: A Literature Survey Focussing on its Technical Application and Prospects, 17th European Biomass Conference and Exhibition, Jun. 29-Jul. 3, 2009, Hamburg, Germany, pp. 1037-1687.
Kleinert, Mike, et al., Carbonisation of Biomass Using a Hydrothermal Approach: State-of-the-Art and Recent Developments, 17th European Biomass Conference and Exhibition, Jun. 29-Jul. 3, 2009, Hamburg, Germany, pp. 1683, 1687.
Zhang, Bo, et al., Reaction Kinetics of the Hydrothermal Treatment of Lignin, Appl Biochem Biotechnol, 2008, pp. 119-131, vol. 147, Humana Press Inc.
Sakanishi, Kinya, et al., Biomass Energy: Produce Liquid Fuel From Forest Resources, National Institute of Advanced Industrial Science and Technology, 16 pages.
Sasaki, Yoshiyuki, Conversion of Woody Biomass to Chemicals, Biomass Asia Workshop, Jan. 20, 2005, 21 pages.
Kamimoto, Masayuki, The Significance of Liquid Fuel Production From Woody Biomass, National Institute of Advanced Industrial Science and Technology, printed in Jul. 2006, 12 pages.

* cited by examiner

METHOD FOR WET TORREFACTION OF A BIOMASS

CROSS-REFERENCE TO RELATED APPLICATIONS

This application claims the benefit of and priority to prior filed Provisional Application Ser. No. 61/480,813, filed Apr. 29, 2011, and Provisional Application Ser. No. 61/411,661, filed Nov. 9, 2010, both of which are expressly incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract/Grant No. DE-EE0000272 awarded by the U.S. Department of Energy.

FIELD OF THE INVENTION

The invention relates generally to devices and methods for wet torrefaction of a biomass.

BACKGROUND OF THE INVENTION

In 2008, the United States produced 8.5 million barrels of petroleum oil per day while the demand was 19.5 million barrels per day, thus only half of the requirement could be produced domestically. Alternative sources like ethanol can play a vital role in this situation. Presently, about 9 billion gallons of ethanol is produced per year, which is only a quarter of the amount of renewable fuel that the U.S. is looking for by 2022 according to The Energy Independence and Security Act (EISA) of 2007. Some potential sources like corn are not feasible because of the deficiency of food in the world. Again, with the environmental problems caused by various organic wastes, lignocellulosic biomass is considered one of the most important sources of renewable energy and, of course, it is not a food. Coniferous and deciduous wood, switch grass, rice hulls, corn stover, straws, and bagasse are typical types of lignocellulosic biomass. Direct combustion of lignocellulosic biomass can produce energy but handling and transportation are of concern in commercializing this process despite the fact that lignocellulosic biomass itself is not expensive. With thermochemical pretreatment, biomass can be made more dense in both mass and energy; reducing transportation and handling difficulties. Moreover, it reduces hydrophillic behavior making it simpler to store, and, also increases grindability.

Wet torrefaction and dry torrefaction are two promising kinds of pretreatment processes. Biomass treated with hot compressed water in an inert atmosphere is known as wet torrefaction or hydrothermal pretreatment, while dry torrefaction does not use water. Temperatures of 200-260° C. are needed for wet torrefaction and pressures reach up to 700 psi. The solid product has 55-90% of the mass and 80-95% of the fuel value of the original biomass. For dry torrefaction, the temperature is maintained at 200-300° C., and it can recover 60-80% of mass and 70-90% energy value. In earlier attempts at wet torrefaction reaction, the reaction temperature was slowly achieved over 10-15 minutes before the desired reaction temperature was achieved and maintained for at least 5 minutes and more commonly for several hours. For dry torrefaction, the reaction temperature is maintained for about 80 minutes.

Long reaction times used in the older processes require greater energy input and larger reaction vessels thereby decreasing the net energy yield from the reacted biomass. As such, processes and devices that increase the efficiency of wet torrefaction process are needed so as to improve the energy yields and to meet the growing energy demand.

Moreover, the long reaction times used in older processes result in the formation of a byproduct sludge that increases the difficulty of processing and handling biomass treated with those processes. Processes and devices are needed that increase both mass and energy density of biomass under conditions that either do not form the byproduct sludge or that form substantially reduced levels of the sludge.

Transporting, handling, and storing untreated lignocellulosic biomass can be challenging because of the low bulk density of the untreated biomass and the tendency of the biomass to rot unless stored under ideal conditions. Treatment of lignocellulosic biomass, for example, with dry torrefaction or wet torrefaction processes that utilize long reaction times can improve the bulk density and increase the range of storage conditions necessary to prevent rotting, but the treated products themselves are frangible and can be very difficult to handle. Forming the treated lignocellulosic biomass into pellets can remedy these problems. Forming pellets from treated biomass requires the presence of a binder in the biomass to maintain the structural integrity of the pellets. However, biomass treated under the dry torrefaction conditions or wet torrefaction processes that utilize long reaction times, destroys completely, or degrades a large portion of the natural materials found in the biomass that could function as a binder, namely lignin. Processes that increase the bulk density of lignocellulosic biomass while preserving sufficient levels of natural binding agents are needed.

SUMMARY OF THE INVENTION

Described herein is a process for increasing the mass and energy densities of a biomass, which includes establishing a temperature and pressure within a reaction chamber that is at or above a desired reaction condition wherein the desired reaction condition is sufficient to increase the mass and energy density of a reacted biomass; introducing a biomass into the reaction chamber such that the desired reaction condition is maintained or equilibrates thereto; and subjecting the biomass to the desired reaction condition for an amount of time effective to increase the mass and energy density of the reacted biomass relative to the biomass prior to reaction. The reacted biomass is readily formed into durable, stable, dense pellets by standard pelletizing methods.

DETAILED DESCRIPTION OF THE INVENTION

Embodiments of the present invention are directed to improved processes for conducting wet torrefaction of a biomass, also known as hydrothermal carbonization or hydrothermal pretreatment. As described above, in known wet torrefaction processes, the biomass was reacted for relatively long periods of time, i.e., at least 5 minutes to several hours. Those lengthy reaction times were used because it was not appreciated that the wet torrefaction reaction could be completed in very short periods of time, i.e., less than 5 minutes, when the biomass is exposed to desired reaction conditions. The present inventive process is based on the surprising discovery that under desired reaction conditions, the wet torrefaction process can be completed in a very short period of time, i.e., less than 5 minutes and preferably, in less than 2 minutes, and more preferably in about 1 minute.

The improved process includes establishing conditions in a reaction chamber such that when biomass is added to the reaction chamber, the conditions within the reaction chamber will be maintained at/or equilibrate to a desired reaction condition. The biomass is subjected to the reaction condition for an amount of time effective to increase the energy density of the reacted biomass relative to the biomass prior to the reaction. Upon completion of the reaction, the reacted biomass may then be quickly cooled and prepared for use. Exemplary uses of the reacted biomass include as a fuel source (i.e. solid, liquid, or gases) or as a soil amendment.

Any source of cellulosic biomass may be used in the process, such as plants, microorganisms, or waste materials. Exemplary plant material includes woody plants such as loblolly pine and sierra pine, grassy plants such as switch grass, and various agricultural residual products such as rice husks and corn stover. Examples of microorganisms include algae, yeast, or other microorganisms that can be grown and/or collected in mass or cost effectively. Exemplary waste materials include wastewater sludge, municipal solid waste, manure, and other agricultural residues. The biomass may be chopped into 1 inch by 1 inch or smaller pieces. The smaller the pieces, the more uniformly they can be saturated and reacted.

Useful biomass generally contains certain components that are particularly advantageous for hydrothermal conversion using the wet torrefaction process including hemicellulose, cellulose, lignin and water soluble components. For example, in loblolly pine the percentage ratios of hemicellulose, cellulose, lignin, and water solubles are about 11.9:54:25:8.7 respectively, along with about 0.4% of ash.

Figure 1:
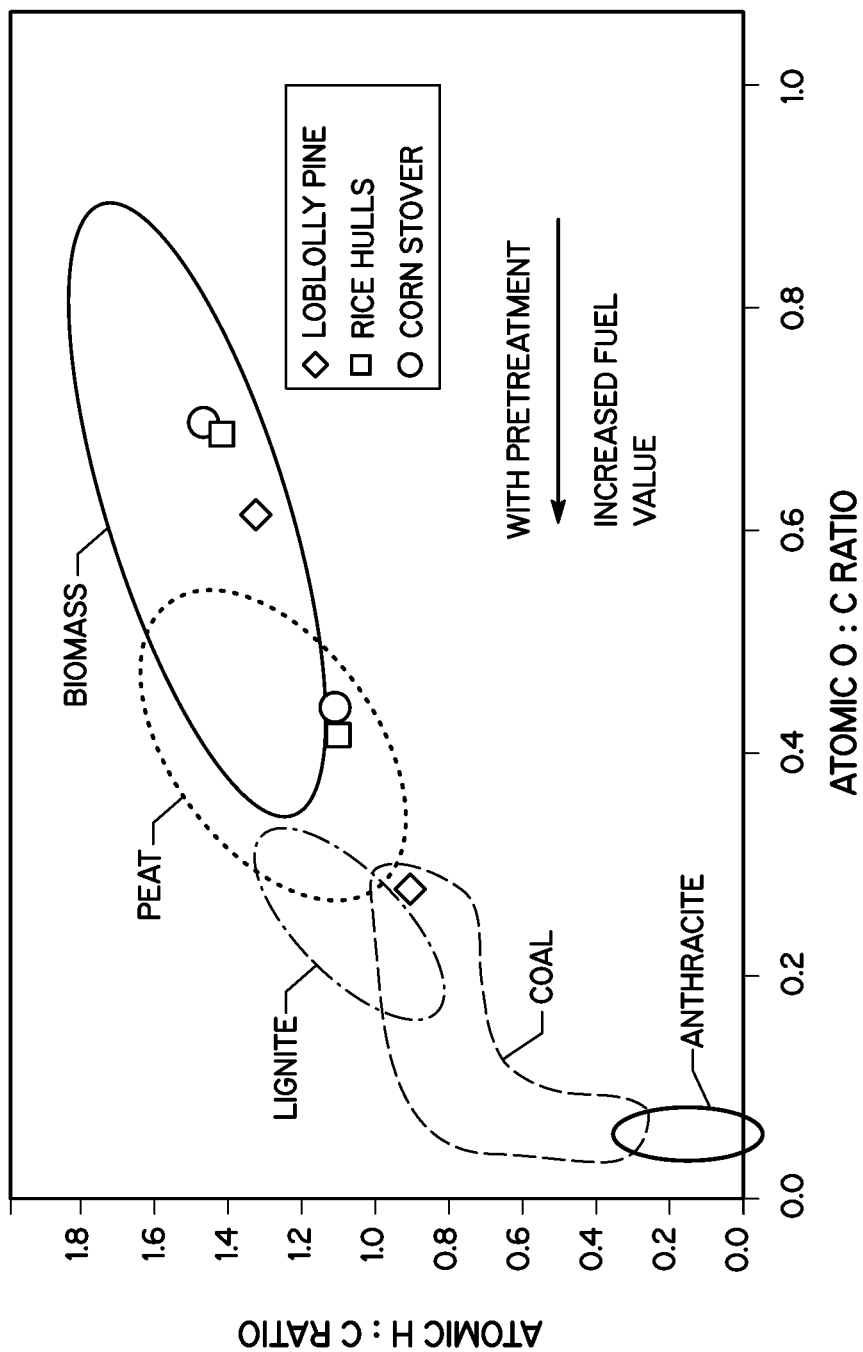
FIG. 1 is a graph showing the effect of wet torrefaction on the ultimate analysis of biomass.

In aqueous media, hemicelluloses and water soluble components decompose at about 200° C. but only 22% of cellulose reacts at this temperature. The rate of reaction increases with temperature and, as a result, 64.2% of cellulose decomposes at 260° C. at 5 minutes reaction time, while only 22.9% of lignin is removed at 260° C. The main products of wet torrefaction of cellulosic biomass include a solid component often called biochar, sugars (e.g., five and six carbon sugars and 5-hydroxy methyl furfural), acetic acid with other organic acids, and $CO_2$. The biochar is essentially a synthetic coal that has a significant increase in the C:H ratio with a similar increase in the C:O ratio when compared to unreacted biomass. FIG. 1 illustrates the effect of wet torrefaction on the elemental analysis of various cellulosic biomass.

The reaction condition within the reaction chamber is established to result in the rapid conversion of hemicellulose, cellulose, lignin, and water solubles into their respective products. Different sources of biomass have different relative concentrations of hemicellulose, cellulose, lignin and water soluble components. The reaction condition may vary depending on the concentrations of the reacting components in the biomass. The reaction condition within the reaction chamber is defined by one or more of the following: temperature, pressure, water saturation, and the presence of an inert atmosphere.

The reaction temperature is established based on the composition of the biomass. Hemicellulose and water soluble components begin reacting at temperatures above 180° C.; cellulose at temperatures above 200° C., and lignin at temperatures above 250° C. To react all three components to the desired degree, the reaction temperature is greater than about 200° C. and preferably between about 230° C. and about 260° C. and more preferably between about 250° C. and about 260° C.

In some embodiments of the invention, the addition of biomass to the reaction chamber can cause a decrease in the pressure in the reaction chamber thereby resulting in an adiabatic decrease in the reaction chamber's temperature. This temperature loss can be countered by increasing the temperature within the reaction chamber by a certain amount prior to the addition of the biomass. For example, if the addition of the biomass results in a loss of 25° C. and the desired reaction temperature is 250° C., then the temperature within the reaction chamber prior to the addition of the biomass will need to be about 275° C. to accommodate for the temperature loss.

In some embodiments, the adiabatic temperature decrease is avoided or decreased by preventing or decreasing the pressure loss in the reaction chamber during the addition of biomass. For example, the biomass can be loaded into an airlock, such as a loading chamber capable of being pressurized, which is connected to the reaction chamber. The airlock would then be pressurized prior to transferring the biomass from the airlock to the reaction chamber. It is understood that the pressure within the airlock need not match the pressure in the reaction chamber and that increasing the temperature in the reaction chamber can be used in combination with the airlock to obtain or maintain the desired reaction condition.

In addition to the reaction temperature, the pressure within the reaction chamber needs to be sufficient to maintain the heated water in a compressed state. Thus, the reaction pressure is at least the saturated vapor pressure of water at the reaction temperature.

The reaction chamber must contain at least enough condensed water to saturate the biomass. The ratio of water to biomass may range between about 5:1 w/w to about 75:1 w/w. In one embodiment, the water to biomass ratio is about 5:1. In another embodiment, the ratio is about 75:1.

The reaction condition includes an inert atmosphere in the reaction chamber. For example, the reaction chamber is purged with an inert gas, such as nitrogen, prior to initiating the reaction to completely or partially purge oxygen from the reaction chamber.

The biomass is exposed to the reaction condition for an amount of time effective to increase the energy density of the reacted biomass relative to the unreacted biomass. Preferably, the energy density is increased by at least about 40% over the unreacted biomass. In addition, the energy yield (i.e., the amount of original fuel value retained) is preferably at least about 70% with high value feedstocks such as loblolly pine, and at least about 40% for low value feedstocks, such as switch grass. In one embodiment, an exposure time of up to about five minutes is sufficient to achieve the desired energy densification. In another embodiment, the exposure time is up to about three minutes. In a further embodiment, the exposure time is about one minute. Biomass treated with some embodiments of the inventive process utilizing these shortened time periods surprisingly have substantially decreased levels of byproduct sludge as compared to biomass reacted in older processes utilizing longer reaction times. In some embodiments, no byproduct sludge is observed in biomass treated with the inventive process.

The reacted biomass results in an energy dense, friable, hydrophobic solid product, also known as biochar, that may be used directly as a fuel, or can be mixed, for example, with coal for use in existing coal fired boilers. The co-firing use is particularly advantageous because it reduces the release of so-called green house gases from coal fired plants without the costs of extensively retrofitting the plant. The biochar could also be used as a soil amendment or as a feedstock for other processes, such as gasification, pyrolysis, and liquefaction.

Biochar may be formed into pellets to ease transport, handling, and use. Some types of biomass contain a significant fraction of lignin, which can be used as a binder for pelletization in a hot-press extrusion process. The ability of lignin to function as a binder is due to its glass transition temperature and melt temperature, which is subject to degradation by heat and pressure. Unlike older dry torrefaction and long wet torrefaction processes, in embodiments of the invention, lignin is only partially degraded, or not degraded at all, and thus remains available in an amount effective to act as a binder for the pelletization of the biochar product. Indeed, with the densification that occurs under the inventive conditions, the concentration of lignin in the biochar is greater than that found in untreated biomass. Moreover, as the treatment process increases beyond the inventive timeframe, the quality of lignin in the biochar deteriorates significantly. In embodiments of the invention, the lignin concentration in the resultant biochar is sufficient to allow the formation of durable pellets from the biochar without the addition of exogenous binders. The improved pelletization afforded by the inventive process significantly improves the efficiency in handling and using the biochar such as an energy source.

The liquid fraction of the reacted biomass can also be recycled back into the reactor chamber where soluble components can precipitate into solids that deposit on the biochar. In some embodiments, the recycled liquid, with a degree of acidity, catalyzes the wet torrefaction reactions, allowing the inventive wet torrefaction process to be conducted at lower temperatures, or in a shorter amount of time. In addition, desirable products like sugars and substituted furans can be separated from the liquid fraction for use in other processes such as feedstocks for fuels or in other chemical processes.

Figure 2:
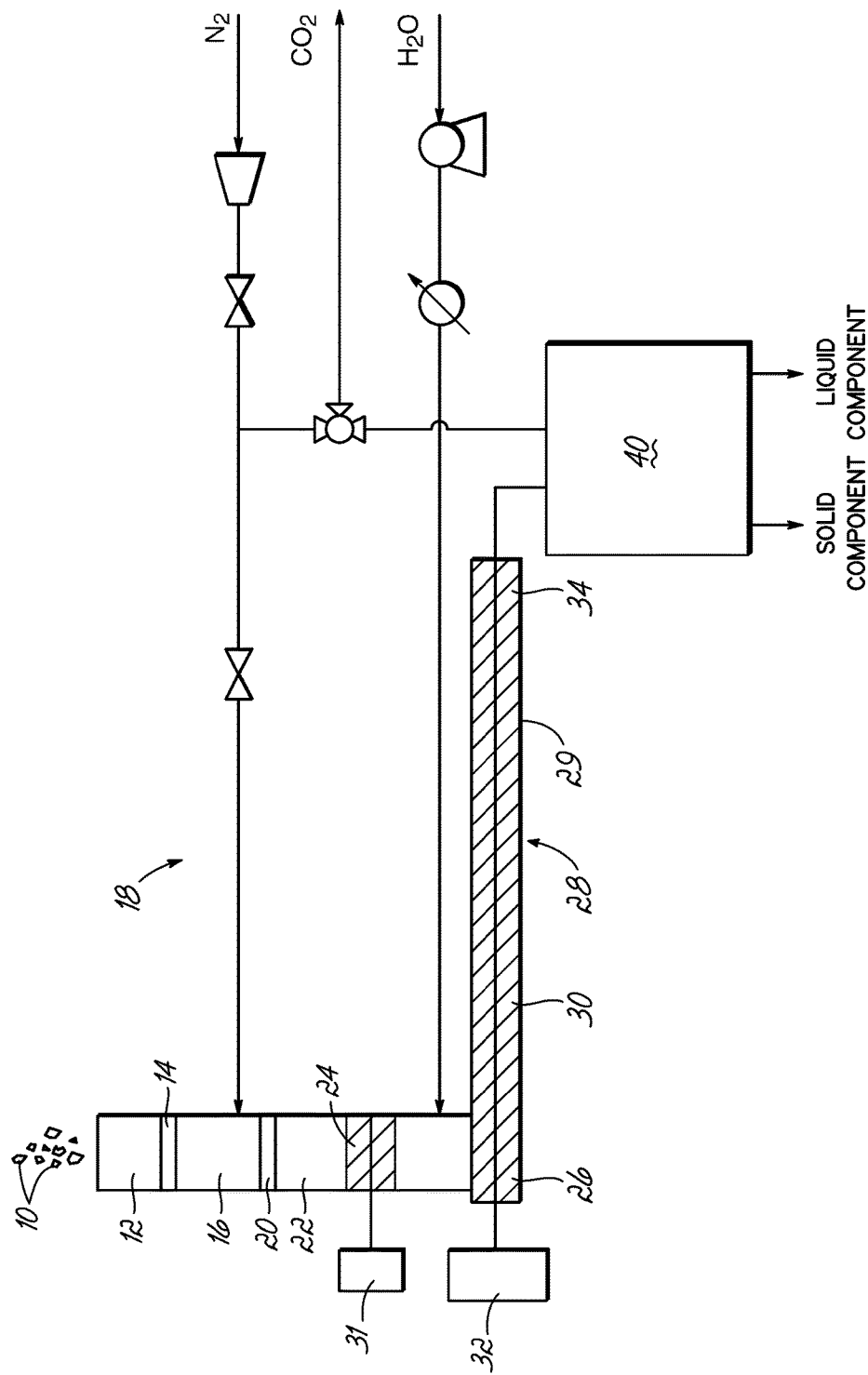
FIG. 2 is a schematic of a system for practicing wet torrefaction in accordance with embodiments of the invention.

FIG. 2 shows an exemplary system for conducting the inventive wet torrefaction process on a commercial scale. Biomass, such as chipped wood 10, is placed into a first hopper 12. The first gate valve 14 separates the first hopper 12 from a second pressurized hopper 16, which is pressurized with an inert gas, such as from an inert gas compression system 18. A second gate valve 20 separates the second hopper 16 from a pressurized chamber 22 having a metering screw 24, which introduces the biomass to a first end 26 of reaction chamber 28 (or reactor 28). The reaction chamber 28 is pressurized and includes a water ($H_2O$) input near the first end 26, a heater 29 and an auger 30 for moving the reacting biomass from the first end 26 of the reaction chamber 28 to a second end 34 of the reaction chamber 28 where a slurry that includes the solid and liquid components of the reacted biomass is removed. The metering screw 24 and auger 30 are rotated by motors 31 and 32. The solid and liquid components are separated and further processed in a separation and processing system 40 as is known in the art for their respective uses in accordance with embodiments of the invention.

The inventive wet torrefaction process will be further appreciated in light of the following examples.

Example 1

Materials and Methods

Biomass—For wet torrefaction, loblolly pine (Alabama, USA) was used as lignocellulosic biomass. A biomass size of about 0.7 mm to about 0.3 mm was selected for this study.

Steel Mesh—Stainless steel mesh T316L 325/0014 48" wide from TWP Inc. (Berkley, Calif.) was used for making the sample holder. A 2"×1.5" dimension was needed for one sample holder, which weighs roughly about 0.4 g. A cylinder of 0.5" diameter was made from that steel mesh to hold the sample of about 0.2 g biomass.

Figure 3:
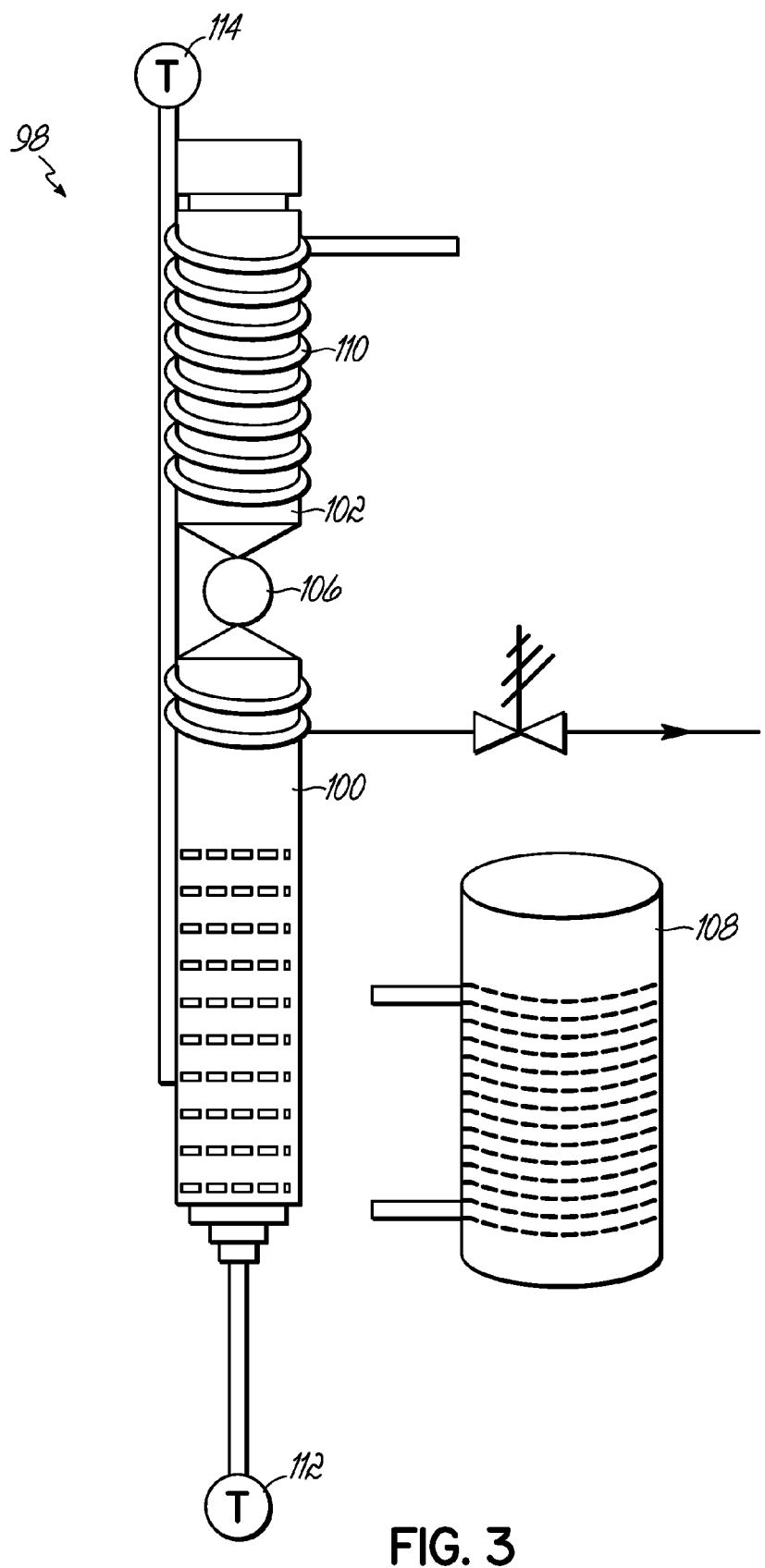
FIG. 3 is a schematic of a device for practicing wet torrefaction of a biomass in accordance with embodiments of the invention.

Wet Torrefaction—A special kind of two chambered reactor 98 was designed for this study and is shown in FIG. 3. It was made of 316 stainless steel. The bottom chamber 100 contained water in an inert atmosphere and underwent heating while the upper chamber 102 contained a stainless steel sample holder (not shown) filled with 0.2 g of biomass with a ball valve 106 separating chambers 100 and 102. The bottom chamber 100 had a volume of 20 ml while the upper chamber 102 had a volume of 10 ml. The ball valve 106 was a SS-T163MF8 Ball Valve-Thermal ½ MNPT of Swagelok, Northern CA. A Vacuum-Formed Ceramic Radiant Heater 108 (shown separate from the bottom chamber), model no. CRFC-36/115-C-A from Omega was used for heating the bottom chamber 100 of the reactor 98. A copper cooling coil 110 prevented the upper chamber 102 from being heated by conduction. The ball valve 106 was opened to move the sample holder from the upper chamber 102 to the lower chamber 100 and start the reaction.

Controlling the inside temperature of the water in the reaction chamber 98 was very difficult with the radiant heater 108 because tended to overshoot the target temperature by about 40° C. or more. Two thermocouples 112 and 114 were used to monitor the temperature inside of the bottom chamber 100. A thermocouple 112 was place inside the bottom chamber 100 of the reaction chamber 98 and thermocouple 114 placed outside of the heater 108 and controlled the temperature of the radiant heater 108 and eventually it controlled the inside temperature of the water. It was found that the difference between the inside and outside temperature was always 90° C. as it lost some heat to the atmosphere. Therefore, the heater 108 was set for 290° C. for 200° C. experiments and this difference was the same for the other temperatures too. The cooling coil 110 (water as the cooling medium) surrounded the upper chamber 102 and ball valve 106 to maintain the sample at 25° C. De-ionized water (15 ml) was loaded into the bottom chamber 100 and the sample holder 104 containing about 0.2 g of biomass into the upper chamber 102. Nitrogen of 60 atm was passed though the reaction chamber 98 for 10 minutes to drive out oxygen from inside thereby rendering the atmosphere inside the chamber inert. The bottom chamber 100 was heated 25° C. more than the desired temperature to account for adiabatic temperature loss (such as 225° C. for 200° C.) experienced when the ball valve 106 was opened to drop the sample holder 104 into the hot water in the bottom chamber 100. During that time, the temperature of the whole reaction chamber 98 was stabilized to the desired reaction temperature.

A stopwatch was used to count time as the reaction starts instantly. After a specified time, such as 15 s, 30 s and 5 minutes, the reaction chamber 98 was immersed into an ice-water bath to drop the temperature rapidly to room temperature. It reached 180° C. from 260° C. in less than 20 s and as hemicelluloses starts reacting at 180° C., the reaction is quenched within 20 s. For lower temperatures, it took less time to reach 180° C. Lignocellulosic biomass does not react between room temperature and 180° C. At room temperature, a sample was taken out of the reaction chamber 98. It was washed thoroughly with de-ionized water to remove sugars and other aqueous products from the surface of the solid product. The solid residue was dried for 24 hours in 105° C. oven to remove moisture and volatile chemicals and weighed.

Higher Heating Value—Higher heating value (HHV) of the dried solid residue (dried for 24 hours at 105° C.) was measured in a Parr 1241 adiabatic oxygen bomb calorimeter (Moline, Ill.) with continuous temperature recording.

Results and Discussions

Analysis of Wet Torrefaction of Loblolly Pine—Without being bound to any particular theory, at the temperature range of about 150° C. to about 230° C., lignocellulosic biomass reacted with hydronium ion. In this case, water acts as a catalyst as it produces hydronium ion for this reaction. First, heterocyclic ether bonds of hemicelluloses degrade to oligosaccharides and thus separate acetyl groups from the raw biomass. Then, polysaccharides degrade and hydronium ion comes into action of this stage. Polysaccharides can be depolymerized to oligomers and monomers while sugars can be dehydrated to furfural and 5-hydroxy methyl furfural (5-HMF), depending on the operating conditions.

Wet torrefaction at three different temperatures, i.e. 200° C., 230° C., and 260° C., was performed while changing the reaction time. For the first minute, 15 seconds intervals were chosen while 1 minute increments were chosen after that. Five minutes time is taken as the maximum reaction time for this example. For each temperature and each reaction time at least three experiments were performed and mean values are reported. Mass yield, energy densification ratio, and energy yield are three main criteria for this experiment, which may be defined as:

$$\text{Mass yield} = \frac{\text{Mass of dried pretreated solid}}{\text{Mass of dried biomass}}$$

$$\text{Energy densification ratio} = \frac{\text{HHV of dried pretreated solid}}{\text{HHV of dried biomass}}$$

$$\text{Energy yield} = \text{mass yield} \times \text{energy densification ratio}$$

Figure 4:
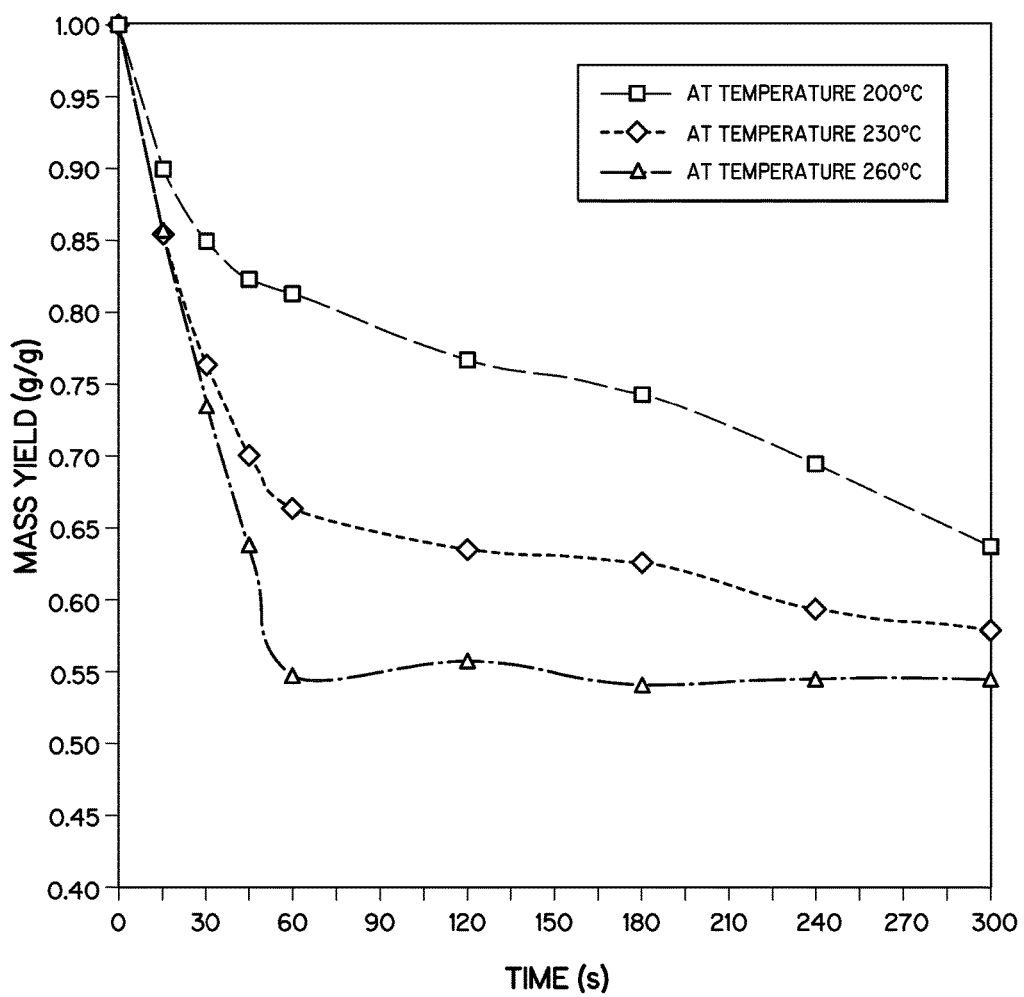
FIG. 4 is a graph illustrating the decrease in mass yield for wet torrefaction of loblolly pine at different temperatures in accordance with embodiments of the invention.

The results shown in Table 1 below, as well as FIG. 4, show the importance of kinetics measurements and that the reaction reaches near completion in a very short period of time. Here mass yield at different reaction times with different temperatures is presented. After 5 minutes of reaction time, mass yield was 0.54, 0.58, and 0.64 for 260° C., 230° C., and 200° C., respectively. The mass yield reached 0.55, 0.65, and 0.81 at 260° C., 230° C. and 200° C., respectively, after the very first minute. The biomass lost maximum mass in the very first minute at all three temperatures of 200° C., 230° C., and 260° C. This result makes sense because hemicelluloses and water solubles react instantly while cellulose reacts after 230° C. along with some lignin, which react at temperatures above 260° C. The rate of reaction increased with the increment of temperature. 75:1 water to biomass residue was used in this example. At lower temperatures, e.g., 200° C., the process produced a lot of sugars such as arabinose, xylose, mannose, galactose, glucose, and 5-hydroxy methyl furfural. Most of the sugars, except 5-HMF, degraded at higher temperature.

TABLE 1

Wet torrefaction of loblolly pine

| Temperature (° C.) | Time (s) | Mass Yield (g/g) | HHV (cal/g) | Energy densification ratio | Energy yield (cal/g/cal/g) |
|---|---|---|---|---|---|
| 200 | 15 | 0.9013 | 4648.1 | 1.01 | 0.9121 |
|  | 30 | 0.8502 | 4665.7 | 1.02 | 0.8637 |
|  | 45 | 0.8245 | 4712.7 | 1.03 | 0.8459 |
|  | 60 | 0.8144 | 4751.9 | 1.03 | 0.8425 |
|  | 120 | 0.7680 | 4877.7 | 1.06 | 0.8156 |
|  | 180 | 0.7445 | 4998.9 | 1.09 | 0.8103 |
|  | 240 | 0.6959 | 5169.6 | 1.13 | 0.7833 |
|  | 300 | 0.6388 | 5236.7 | 1.14 | 0.7284 |
| 230 | 15 | 0.8547 | 4723.5 | 1.03 | 0.8790 |
|  | 30 | 0.7650 | 4893.6 | 1.07 | 0.8151 |
|  | 45 | 0.7019 | 5033.4 | 1.10 | 0.7692 |

TABLE 1-continued

Wet torrefaction of loblolly pine

| Temperature (° C.) | Time (s) | Mass Yield (g/g) | HHV (cal/g) | Energy densification ratio | Energy yield (cal/g/cal/g) |
|---|---|---|---|---|---|
|  | 60 | 0.6648 | 5253.7 | 1.14 | 0.7604 |
|  | 120 | 0.6365 | 5433.3 | 1.18 | 0.7530 |
|  | 180 | 0.6270 | 5536.9 | 1.21 | 0.7559 |
|  | 240 | 0.5951 | 5590.4 | 1.22 | 0.7244 |
|  | 300 | 0.5804 | 5601.4 | 1.22 | 0.7079 |
| 260 | 15 | 0.8583 | 5055.6 | 1.10 | 0.9447 |
|  | 30 | 0.7379 | 5249.9 | 1.14 | 0.8434 |
|  | 45 | 0.6369 | 5735.9 | 1.25 | 0.7954 |
|  | 60 | 0.5590 | 6220.3 | 1.35 | 0.7440 |
|  | 120 | 0.5494 | 6307.8 | 1.37 | 0.7677 |
|  | 180 | 0.5470 | 6340.4 | 1.38 | 0.7634 |
|  | 240 | 0.5460 | 6344.5 | 1.38 | 0.7556 |
|  | 300 | 0.5430 | 6252.8 | 1.36 | 0.7433 |

The HHV of raw loblolly pine is 4593.028 cal/g.

Figure 5:
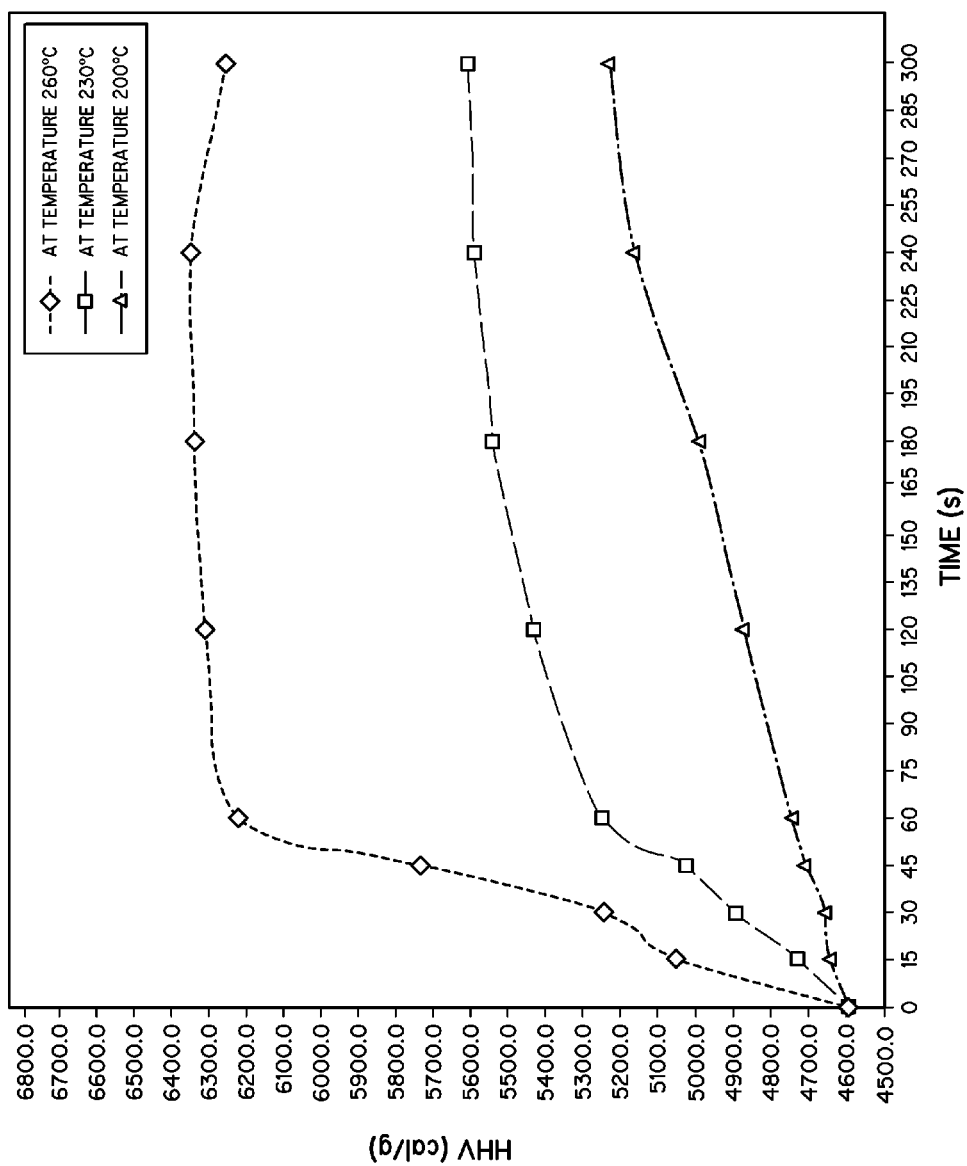
FIG. 5 is a graph illustrating the higher heating value (HHV) for wet torrefaction of loblolly pine at different temperatures in accordance with embodiments of the invention.

FIG. 5 shows higher heating value (HHV) with time for different temperatures. These data demonstrate that the energy densification ratio increased rapidly through the first minute of the reaction and then it stabilized. After 5 minutes, it reached 6252.8 cal/g, 5604.5 cal/g and 5236.7 cal/g for 260° C., 230° C. and 200° C. respectively. It is noteworthy that after the very first minute HHV was 6220.3, 5253.8, 4751.9 cal/g for 260° C., 230° C. and 200° C. The HHV of these pretreated products showed the same time dependent change as it increased sharply in the very first minute and then became steady with time. The kinetics measurements demonstrate that the inventive processes can decrease the cost of operating at a higher reacting temperature and also can reduce the volume of the reaction chamber when the shortened time period, such as less than 5 minutes or about 1 minute, is used as the reaction time. The kinetic measurements are applicable to designing continuous processes as well.

Kinetic Model for Wet Torrefaction—Since hemicelluloses, cellulose, and lignin are reacted in wet torrefaction and the molecular structures and reaction scheme are complex, it is difficult to say what chemical structure is changing at any given time. But we can say that hemicelluloses and water solubles degrade quickly at lower temperature even at 200° C. The cellulose reaction rate is a little bit slower than that of hemicelluloses, and lignin reacts on such a small scale that we can assume that lignin is not reacting at even 260° C. A simplified model of two parallel first order reactions was tried for this study. Wet torrefaction of hemicelluloses and cellulose follows a pseudo first order reaction individually. Thus, hemicelluloses and water soluble components dominated initially and then cellulose came into action after the first minute. Meanwhile, lignin follows a two stage reaction mechanism. Low molecular weight lignin fragments are undergone for lignin-carbohydrate bond breakage. Lignin is re-polymerized in the presence of organic acids at the later stage, and this is the slower of two stages. As we assume lignin is inert, so, it is reasonable to start with two parallel first order reactions. Again, from studying hemicelluloses and cellulose reactions we can say that the rate of reaction of hemicelluloses is much faster than that of cellulose. Hemicelluloses and water solubles produce gases and sugar solutions with several acids that are soluble in total. However, cellulose forms biochar, water soluble, and gases.

As indicated above, biochar is a carbon-rich solid byproduct of low temperature pyrolysis of biomass. It is often known as charcoal or agrichar. It can be formed under complete or partial exclusion of oxygen at low temperatures below 700° C. It has been used for cooking, health, water purification, etc for the centuries. The manufacturing process of biochar differs from charcoal as it generally is deliberately made for applying in the soil. It is more stable in the soil with other nutrients and it is better than other organic pesticides for plants. Thus, it enhances the soil quality and it reduces the dependency of many organic environmental pollutants.

For comparison, activation energies for both wet and dry reactions were obtained from the slope of rate constant versus inverse temperature graph in a semi-logarithmic plot. It was found that activation energy for wet torrefaction was quite lower than activation energy for dry torrefaction. That means these reactions favor wet conditions rather than dry. Again, activation energy for the first reaction was much lower than the second reaction. Cellulose was rarely as reactive as hemicelluloses and water solubles.

The following equations represent the reaction rates of the two parallel reactions:

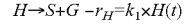

$H \rightarrow S+G \quad -r_H = k_1 \times H(t)$

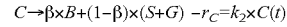

$C \rightarrow \beta \times B + (1-\beta) \times (S+G) \quad -r_C = k_2 \times C(t)$ Where, H and H(t) represents hemicelluloses with water soluble, and that remaining after any time t. Similarly C and C(t) as cellulose, cellulose remains after any time t. S, G, and B represent solubles, gases, and biochar respectively. β is the rate of conversion of biochar from cellulose. $r_H$ and $r_c$ are the rate of reaction for hemicelluloses with water solubles, and celluloses respectively. So, the components after time t should be:

$H(t) = H_0 \exp(-k_1 \times t)$ $C(t) = C_0 \exp(-k_2 \times t)$ $B(t) = \beta C_0 [1 - \exp(-k_2 \times t)]$ $L(t) = L_0$ Here $H_0$, $C_0$, $L_0$ represents initial mass yield (g/g) of hemicelluloses and water solubles, cellulose, and lignin respectively. So, if $M_Y(t)$ be the mass yield of biomass at any time t then we can write:

$M_Y(t) = H(t) + C(t) + B(t) + L(t)$

Figure 6:
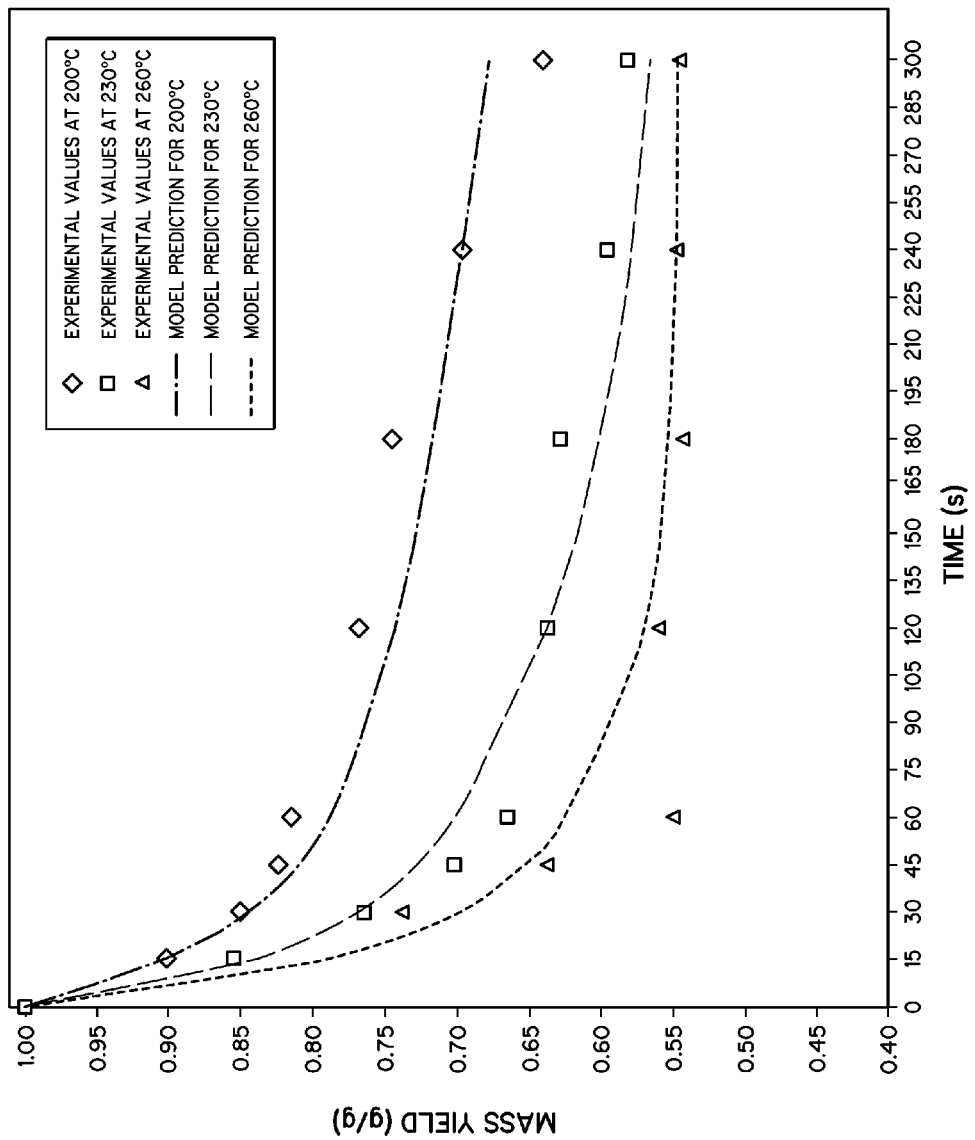
FIG. 6 is a graph illustrating a model prediction for wet torrefaction of loblolly pine at different temperatures in accordance with embodiments of the invention.
Figure 7:
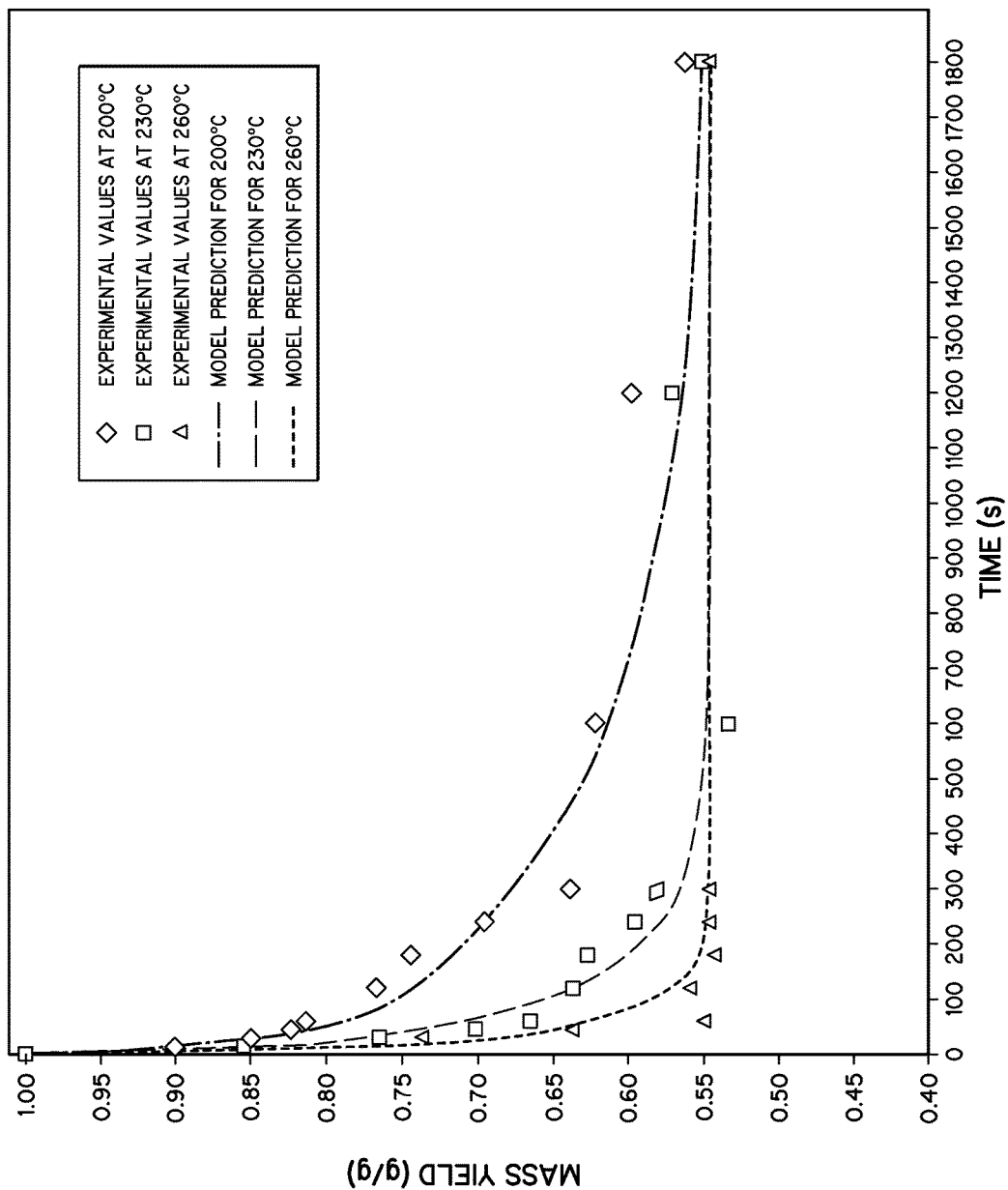
FIG. 7 is a graph illustrating a model predicting the kinetics of wet torrefaction of loblolly pine during a 30 minute reaction in accordance with embodiments of the invention.

With some simplification on biochar calculation it can be written as:

$M_Y(t) = H_0 \exp(-k_1 \times t) + C_0 \exp(-k_2 \times t) + \beta C_0 [1 - \exp(-k_2 \times t)] + L_0$ Fitting of Mass Yield Curves for Wet Torrefaction In the kinetic modeling shown in FIG. 6, the hemicelluloses with solubles, cellulose, and lignin contents in the raw loblolly pine were considered to be 20%, 54%, and 26%. And from FIG. 4, we see that mass yield was decreasing for 200° C. and 230° C. after 5 minutes, but it is almost the same for 260° C. Further, as seen in FIGS. 4 and 6, the mass yield at all three temperatures approached the value achieved at 5 minutes for the 260° C. reaction. It is reasonable to assume mass yield after an infinite time at these temperatures is same, and it is 0.54. That means 54% of the cellulose converts into biochar after the reactions are completed. We can have this number from the experiment at 260° C. after 5 minutes and from the thirty minute data for all three temperatures tested (FIG. 7). Again, if lignin is not reacting at these temperatures, then we can write:

$$100\%-H_0-C_0(1-\beta)=M_Y$$

The conversion factor, β is calculated from this equation. That means $k_1$ and $k_2$ are the two unknowns in this case. Using any solver for curve fitting we can find $k_1$ and $k_2$. In this case Microsoft Excel 2007 was used for minimizing this objective function:

$$OF = \sum_{i=1}^{8} (M_{Y,exp} - M_{Y,model})^2$$

OF represents the objective function while $M_{Y,model}$ is the calculated mass yield and the number of summation is 8 because there are 8 reaction times for each temperature.

Figure 8:
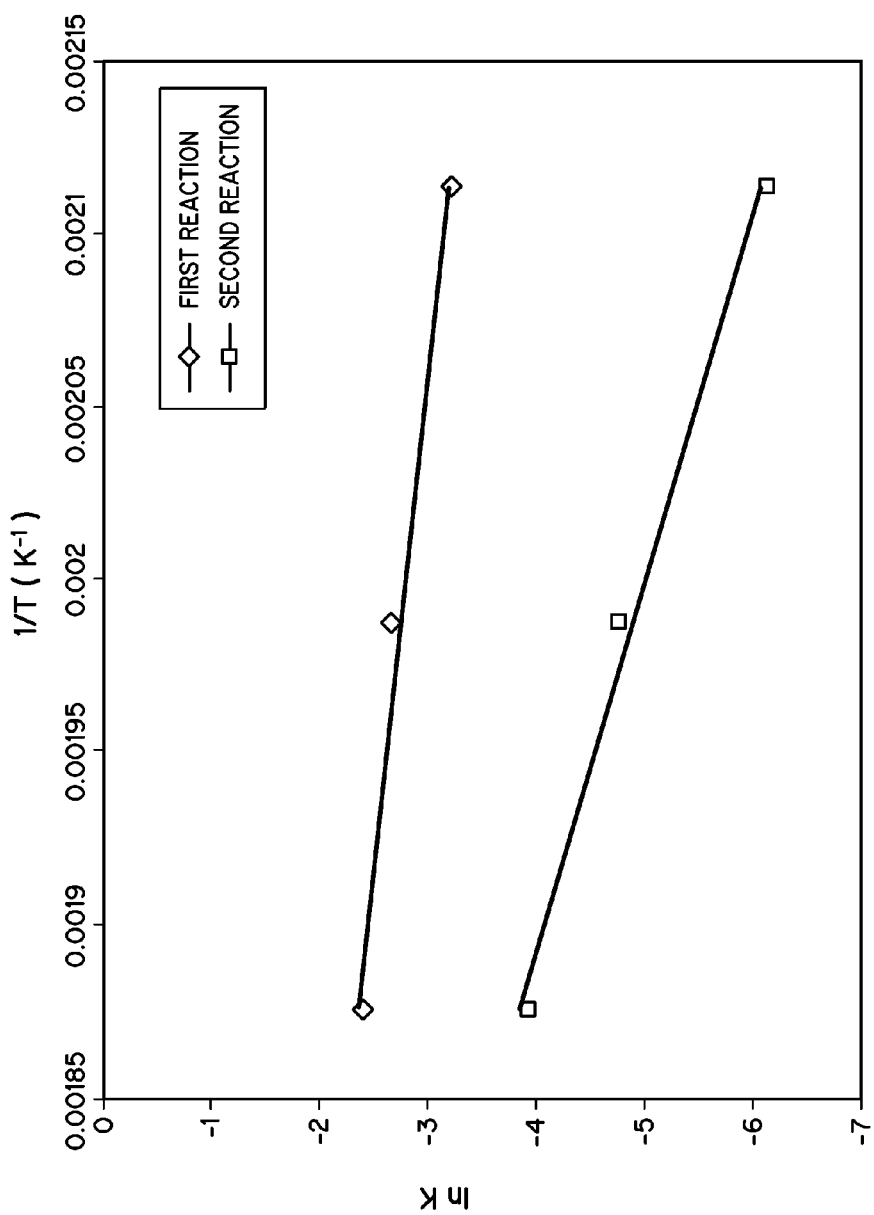
FIG. 8 is a graph illustrating the determination of kinetic parameters of wet torrefaction of loblolly pine in accordance with embodiments of the invention.

Kinetic parameters of wet torrefaction—Table 2 represents the kinetic parameters of wet torrefaction of loblolly pine. Different k values for all three temperatures are plotted with inverse time in a semi-logarithmic scale and two straight lines of different slopes are found. FIG. 8 represents these two straight lines. Activation energies are calculated from these slopes, and it is found that the activation energy for the first reaction is 28.562 kJ/mol, while it is 77.422 kJ/mol for the second. That means the activation energy of the second reaction is more than 2 times the activation energy of the first reaction. The first reaction involves the decomposition of hemicelluloses and water solubles, and it is faster than decomposition of cellulose.

TABLE 2

Kinetic parameters of wet torrefaction of loblolly pine

| Temperature (° C.) | $k_1$ ($s^{-1}$) | $E_1$ (kJ · $mol^{-1}$) | $k_2$ ($s^{-1}$) | $E_2$ (kJ · $mol^{-1}$) |
|---|---|---|---|---|
| 200 | 0.04 | 28.526 | 0.0022 | 77.422 |
| 230 | 0.07 | | 0.0085 | |
| 260 | 0.09 | | 0.02 | |

The results of dry torrefaction of willow wood (a kind of hardwood) using thermogravimetric analyzer (TGA) have been previously reported. And kinetic models were constructed with two parallel first order reactions in which 75.98 kJ/mol and 151.71 kJ/mol were found as the two activation energies for two reactions, while others have reported 76 kJ/mol and 143 kJ/mol as the activation energies for beech wood. That means that the hardwood activation energy of dry torrefaction is higher than the wet torrefaction for loblolly pine, as it is only 28.562 kJ/mol and 77.422 kJ/mol. Although we are comparing hardwood to softwood, it is likely that wet torrefaction has a lower activation energy than dry torrefaction.

Conclusions

Kinetics of wet torrefaction exposes some important information about loblolly pine. In the temperature range of about 200° C. to about 260° C., the process can be represented by two parallel first order reactions. The first reaction is dominated by hemicelluloses and water solubles and is faster than the other reaction where cellulose dominates. Mass yield becomes 56-81% after the very first minute and decreases with time and temperatures until, after 5 minutes, it reaches 54.3-63.8%. We can see the same results in HHV measurements, too. After 1 minute HHV reaches 6220.3, 5253.8, 4751.9 cal/g (increases with time and temperatures) while we get 6252.8, 5601.5, 5236.7 cal/g after 5 minutes respectively. It is reasonable to say that the first reaction has an impact in the very first minute and then the second reaction comes into play. Conducting the wet torrefaction reaction in a shortened period of time, such as less than 5 minutes, e.g., about 1 minute, can minimize the size of the reaction/reaction chamber as well as decrease the associated equipment costs.

Activation energies for wet torrefaction for those two first order parallel reactions are 28.562 kJ/mol and 77.422 kJ/mol, which are only half of the activation energies for dry torrefaction. These data show that reactions of wet torrefaction happen faster than those of dry torrefaction. For the same output, wet torrefaction is more feasible than dry torrefaction.

Example 2

Transportation and handling of lignocellulosic biomass, such as wood, rice hulls, straw and switch grass, are often challenging as they have low bulk density, from the range of 60-80 kg/$m^3$ for agricultural straws and grasses and 200-800 kg/$m^3$ for woody biomass. Thermal or chemical pretreatment processes can produce a mass and energy dense product. The storage of biomass can be facilitated by pretreatment. Pelletization can also increase the mass and energy density of the biomass. It reduces the transportation costs and provides for better handling and feeding. The pelletization process significantly reduces dust formation and causes the product to have a common shape and size. A particular size may be necessary to feed into the boiler in the case of co-firing of biomass with coal. Lignocellulosic biomass pretreatment combined with pelletization potentially could improve storage for seasonal crops which are harvested only a few weeks in a year.

Two different thermal pretreatment technologies are available, as earlier discussed: wet torrefaction and dry torrefaction. Again, in wet torrefaction, biomass is treated with hot compressed water resulting in three products: gas, water solubles, and solid product or biochar. Reaction temperatures are in the range of about 200° C.-260° C., and the pressures are up to about 4.6 MPa. The gas product is about 10% of the original biomass, containing mainly $CO_2$, while the water solubles are primarily sugars, acetic acid, and the other organic acids. The solid product contains about 55%-90% of the mass and about 80%-95% of the fuel value of the original feedstock.

The other alternative, dry torrefaction or mild pyrolysis, treats biomass in an inert gas environment and a temperature range of about 200° C.-300° C. Solid and gases are the two outputs from the process. The solid is about 60%-80% by mass of the original feedstock, with a fuel value of about 70%-90%. The balance are gases.

Both torrefaction processes exhibit solid products with higher energy densification that are easily friable and more hydrophobic relative to the original biomass.

Although the torrefaction processes improve the biomass energy densification, the pelletization process can make torrefied biomass more uniform, dense, and easy to handle. The pelletization process depends on various properties such as temperature, moisture content, biomass type, binder, and pelletizer type, along with pressure.

There are three stages of densification of biomass under pressure for the formation of pellets.

Figure 9:
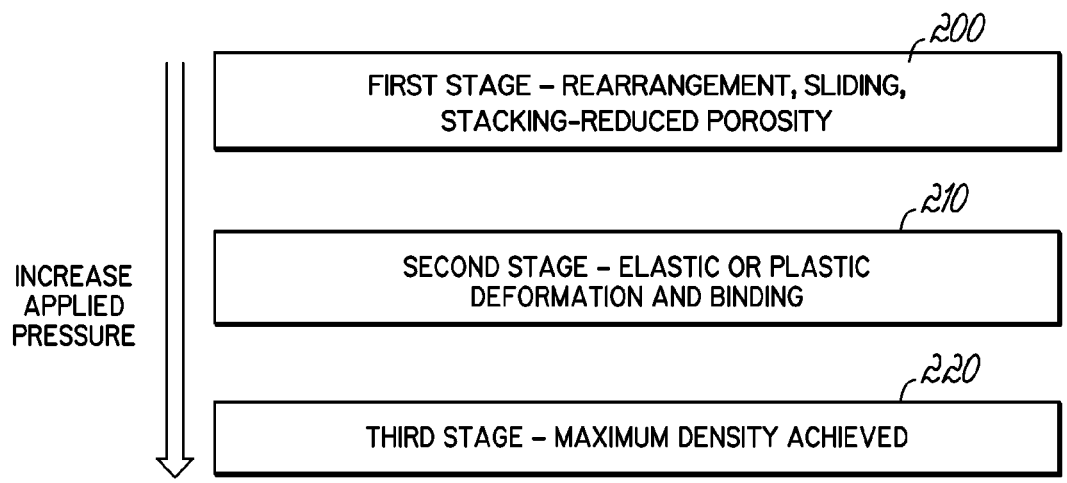
FIG. 9 is a flow chart showing the deformation mechanism of particles under pressure during pelletization in accordance with embodiments of the invention.

With reference to FIG. 9, this figure illustrates the mechanism of binding and pelletization of biomass under compression. In the first stage 200 at lower applied pressures, particles form a close packed mass by rearrangement, sliding, and stacking-reduced porosity but retain their own properties. In the second stage 210 at increased applied pressure relative to the first stage 200, the particles are forced against each other by the applied pressure and plastic or elastic deformation takes place. In this stage, the surface contacts becomes greater by solid bridge, van der Waal's, electrostatic forces, and mechanical interlocking which promotes binding. In the third stage 220 at even higher applied pressures, the volume is again reduced by the applied high pressure until the maximum density is attained. The pellet can no longer change its density after that. The bonding will break up and fragmentation will occur if more pressure is applied.

Binders are used to improve the second stage as they soften at their glass transition temperature, or melt at their melting temperature, to provide a liquid bridge. Once the temperature is reduced back to ambient, the liquid bridge turns into solid bridge. In most cases, a thin adsorption layer (<3 nm) is produced by the binder, which is immobile and can attach to other particles by smoothing the surface roughness or decreasing the inter-particle distance and, thus, the attraction forces come into action, forming a stable bond. Binders can be natural or synthetic. If any component in the feed that shows binding characteristics, it is called a natural binder. For example, lignin, protein, fat, starch and water extractives in lignocellulosic biomass show natural binding tendency. At the glass transition of lignin, it softens and by pressing against the biomass, it makes a covalent bond with the cross-linked polymer chains. Hydrogen bonding of lignin and cellulose surface area can be another type of bonding. One particle's lignin can connect with another particle's cellulose by hydrogen bonding and results in binding. London-van der Waals dispersion forces can be an active inter-particle force between small particles (<1 μm) with the inter-particle distance of 10 Å. Synthetic components can also be used externally to bind the feed materials. Urea-formaldehyde resin (UF resin), phenol-formaldehyde resin (PF resin), lignosulfonate (black liquor), caustic soda, molasses and tar are typical synthetic binders. A binder with a low glass transition temperature or low melting point is preferable.

The role of moisture in pelletization is very important. Moisture can act as a binder and lubricant at the same time. With the help of heat and pressure, water soluble constituents in the biomass such as starch, protein, sugars, soda ash and salts can undergo starch gelatinization, protein denaturation or salt dissolution in the presence of moisture and thus promote binding. Water can make a thin film around the particles, which promotes binding via van der Waals force as the inter-particle contact area is increased. This thin film can show the bonds via capillary sorption between particles. Again the thin film helps the ejecting of the pellet from the die as water is incompressible. Thus, it promotes the lubrication of the pelletization process. There is a critical limit of moisture that can produce good pellets. Above this limit, water causes excess particle-particle lubrication as the fibers are often insoluble in water, causing the center of the pellet to extrude faster than the exterior. Pellets ejected in this condition are shaped like a "Christmas tree". This type of pellet has very low durability and a higher abrasion index. Again water is incompressible and free moisture can break pellets inside the die or make a dome-shaped pellet, which is also weak in strength. The optimum moisture content varies from biomass to biomass as they differ in the feed compositions. Usually, with woody biomass, the critical moisture content is about 7% to about 9% and, for grasses, the critical moisture content is between about 8% to about 12%.

A smaller particle feed size can make high quality pellets as it increases the contact surface area. But very small size particles can jam the pellet mill. It is reported that for alfalfa pellets increasing the screen size from 2.8 to 6.4 mm reduced the durability of the pellets by more than 15%. The L/D (length over diameter) ratio is important for the durability and strength of pellets. Holding time is the time when the pelletization conditions applied on the biomass and relaxation time is the time to release the pelletization conditions. These two times affect the durability and strength of pellets. Even an increase of 10 s in holding time can increase the density of oak sawdust pellets by 5%.

For densification or pelletization of biomass, briquetting machines like hydraulic presses, or pellet mills are very popular. In the case of hydraulic presses, energy can be transmitted to the piston from an electric motor or a manual hydraulic jack. Usually pellet presses can provide more pressure while temperature is controllable by using a temperature controller with the heater. The pellet quality tends to be higher with a hydraulic press because the main parameters can be controlled. But the throughput is lower than for other pelletizers as the cycle of the cylinder is slower. The products from hydraulic presses have higher bulk density as it can handle a higher pressure and a wider range of moisture.

The abrasion index is a common test for pellet durability. The test is called the MICUM test and is specifically used for coal. In this test, a fixed amount of a sample is fed into a rotating drum and the drum is rotated for a certain number of revolutions. The samples are then pulled out of the drum and passed over a sieve to calculate the fraction of samples under a certain size, and this fraction is known as abrasion index. A vibrating bed at a fixed frequency and amplitude can be another exemplary option for durability testing. The mechanical strength of the pellet can be measured, for example, with a tensometer for compression of a pellet in the radial direction. Thermogravimetric analysis can reveal the thermal behavior and a digital scanning calorimeter can determine the glass transition temperature of the feed.

Pellets of wet torrefied biomass were made and the pellet quality and operating conditions needed using a hydraulic press were examined. The solid residue of wet torrefaction is biochar and is also referred to as torrefied biomass. The lignin preserved in the treated biomass by the inventive process for use as a natural binder for pelletization of the treated biomass was tested. The glass transition behavior was verified and the temperature of pelletization was maintained above the glass transition temperature. The abrasion index, durability, modulus of elasticity, ultimate strength of pellets, and equilibrium moisture content (EMC) were determined and compared with the literature.

Materials and Methods

Biomass and Chemicals

Loblolly pine (Alabama, USA) was used as a typical lignocellulosic biomass for torrefaction. The solutions and filter bags for fiber analysis were purchased from ANKOM Technology Inc (Macedon, N.Y.). A hydraulic press of 15 MT and different dies were purchased from Across International (New Providence, N.J.). The heated die with controller was purchased from Across Int. (New Providence, N.J.).

Wet Torrefaction

Wet torrefaction of loblolly pine was performed in a 100 ml Parr bench-top reactor (Moline, Ill.) at temperatures ranging from 200-260° C. The temperature of the reactor was controlled using a PID controller. The reactor pressure was not controlled but indicated by the pressure gauge and ranged from 1-5 MPa. For each run, a mixture of loblolly pine (size of 0.5 mm mesh) and water with a ratio of 1:5 w/w, was loaded into the reactor. Nitrogen of 0.5 MPa was passed through the reactor for 10 minutes to purge the oxygen. The reactor was heated up to the desired temperature and maintained at that temperature for 5 minutes. Then the reactor was cooled rapidly by immersing it in an ice-water bath. The gas was released to the atmosphere. The solid output was filtered from the liquid and put into a drying oven at 105° C. for 24 hours before further analysis.

Pelletization Technique

The biochar was exposed to ambient conditions for 3 weeks to equilibrate the pellet moisture content. Around 1 g of the biochar was fed into the 13 mm die in the hydraulic press. A band heater of 500 W was used to heat the sample and a controller maintained the sample temperature at about 140±2° C. in the die. A pressure (force per area) of 1000 MPa then was applied to the sample manually. The holding time was 30 s for this study. After the holding time, the pressure was released and the heater was turned off simultaneously. The pellet was pulled out from the die and left undisturbed for 2-5 min. It was then stored at room temperature before further analysis. The L/D ratio of the pellets ranged from 0.6-0.75 in this study.

Abrasion Index and Durability

To evaluate the durability or mechanical strength of the pellets, the MICUM test, which is popular for characterization of coal, was adapted here. 40 pellets were charged into a rotating drum with an inner diameter of 101.6 mm and a depth of 95 mm. Two opposite baffles of 25.4 mm×88.9 mm were installed perpendicular to the cylinder wall. The rotation of the drum was selected to be 38 rotations per minute. After 3000 rotations each pellet was analyzed. After being revolved in the drum, the sample was screened using a 1.56 mm sieve. Particles smaller than 1.56 mm were then weighed. Abrasion index is the ratio of mass percentage below the 1.56 mm to the initial sample mass after 3000 rotations. The smaller the abrasion index, the better quality is the pellet.

Equilibrium Moisture Content

The equilibrium moisture content (EMC) was measured at 30° C. by the static desiccators technique. The solid samples were exposed to an environment with constant humidity and temperature for a long period of time, until the moisture in the solid reached an equilibrium value. The humidity in the chamber was maintained at a constant value by keeping the air in equilibrium with an aqueous solution saturated with a particular salt. LiCl and KCl salt solutions were used, with the humidities of 11.3% and 83.6% respectively. The pellets (0.9-1.2 g) were dried at 105° C. for 24 h and then immediately transferred into the desiccators for long enough to reach equilibrium. The weight of the pellets was measured every day and when it was same (within 1 mg) for three consecutive days, it was considered to be at equilibrium.

Higher Heating Value

The higher heating value (HHV) of pellets was measured in a Parr 1241 adiabatic oxygen bomb calorimeter (Moline, Ill.) fitted with continuous temperature recording. The sample of 0.9-1.2 g was dried at 105° C. for 24 h prior to analysis.

Digital Scanning Calorimetry

Digital scanning calorimetry (DSC) is a useful technique to detect the glass transition behavior of the polymers. But the untreated biomass or biochar does not show the glass transition behavior precisely although it has lignin with it. The amount of lignin present in the biomass and biochar may not be enough to show a significant change in heat flow with temperature in DSC. The extraction of lignin is important to detect the glass transition behavior of it. The van Soest method of NDF-ADF-ADL (neutral detergent fiber, acid detergent fiber, acid detergent liquid) dissolution was used to extract lignin from the untreated biomass and biochar. Samples were dried at 105° C. for 24 h prior to extraction. The final solid product of this method was lignin derivative and ash. The ash content of loblolly pine is very low, <1% of raw biomass even for biochar pretreated at 260° C. So, it is reasonable to assume that the residue from the fiber analysis of biochar is primarily lignin or a derivative of lignin. This lignin was then examined in the DSC to detect the glass transition behavior of the biochar.

STA-6000 from Perkin Elmer (MA, USA) was used to determine the thermal behavior of lignin derived from biochar. Derived lignin samples were dried at 105° C. for 24 h prior to the DSC-TGA analysis. Samples between 10-15 mg were placed into the relatively high pressure chamber. The sample size was 0.5-0.7 mm. Gaseous nitrogen of 20 ml/min was charged into the chamber to ensure an inert atmosphere. The adiabatic heat cycle applied was 30° C.-190° C. at a rate of 5° C./min for the entire temperature scan.

Mechanical Strength

The compressive strength of the pellets was measured using the 15 MT hydraulic press from Across Int. (New Providence, N.J.). A single pellet of 8-10 mm height was pressed under compression until it broke or showed the first sign of fracture. The load required to break or make a fracture, is the ultimate compressive strength of the pellet. Ultimate testing machine ADMET-Expert model-2654 was used to determine the modulus of elasticity of the pellets. A single pellet was loaded to the machine, then a compressive force was applied and the longitudinal deformation was recorded.

Result and Discussions

Glass Transition Behavior of Biochar

The glass transition is a property of only the amorphous portion of a semi-crystalline solid. The crystalline portion remains crystalline during the glass transition. At a low temperature the amorphous regions of a polymer are in the glassy state. In this state, the molecules are frozen in place. They may be able to vibrate slightly, but do not have any segmental motion in which portions of the molecule wiggle around. When the amorphous regions of a polymer are in the glassy state, it generally will be hard, rigid, and brittle. Lignin is the only component of biomass that shows glass transition behavior. The extracted or derived lignin by fiber analysis showed the glass transition change in DSC.

Gravitis, et al., reported a glass transition temperature in the range of 137° C.-157° C. for the lignin from 2 min steam exploded Alder chips (Lignin from Steam-Exploded Wood as a Binder in Wood Composites. *Journal of Env. Engr. And Landscape Management*. 2010, 18(2). 75-84). The lignin extracted from raw loblolly pine and the lignin extracted from biochar shows a range of glass transition temperature of 135° C.-165° C. in the heat flow curve over temperature. To detect the glass transition behavior precisely, the derivative of heat flow over temperature was plotted with temperature for samples from raw loblolly pine (FIG. 10A), or loblolly pine subjected to the inventive process at 200° C. (FIG. 10B), 230° C. (FIG. 10C), and 260° C. (FIG. 10D).

MS Excel 2007 was used to differentiate the heat flow over temperature curve. Linear regression was needed for this case as the DSC shows disturbance in the data. Slope command was used for 1000 points (500 points above and 500 below) to get the linear regression slope of those 1000 points at the middle point. The same calculation was done for every point to get the derivative of heat flow over temperature curve. It can be noted that around 10° C. lied on every 1000 points of the original DSC curve of heat flow versus temperature rise.

Figure 10A:
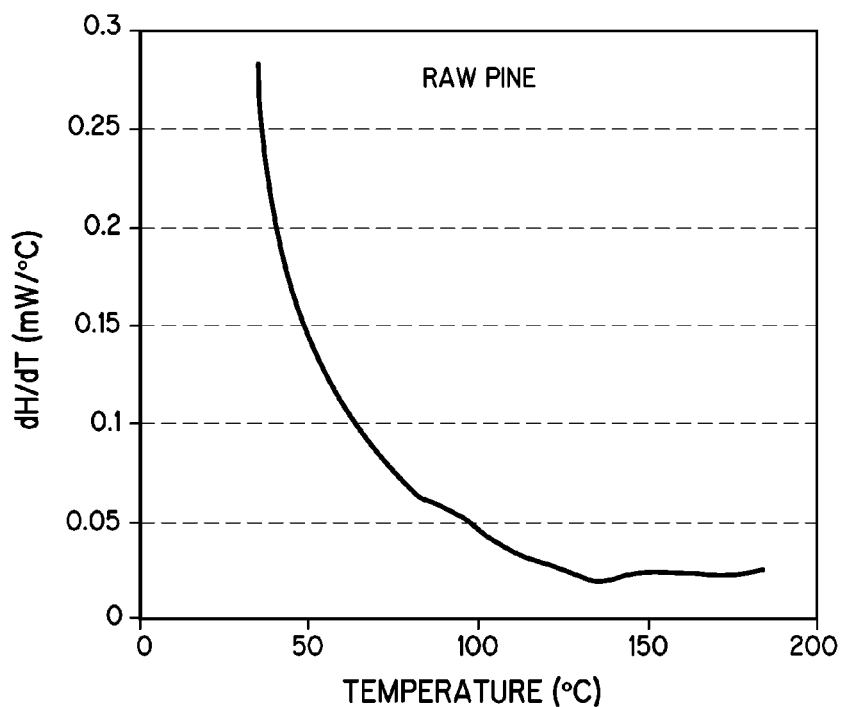
FIG. 10A is a graph illustrating the glass transition temperature of extracted lignin from raw loblolly pine in accordance with embodiments of the invention.
Figure 10B:
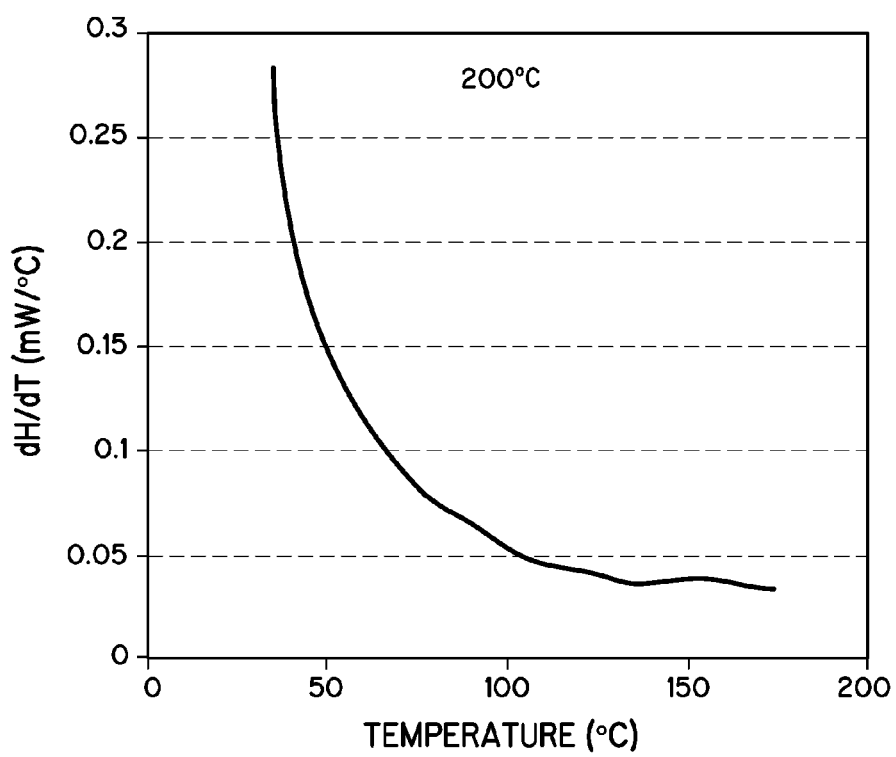
FIGS. 10B-D are graphs illustrating the glass transition temperature of extracted lignin from wet torrefaction biochar in accordance with embodiments of the invention.
Figure 10C:
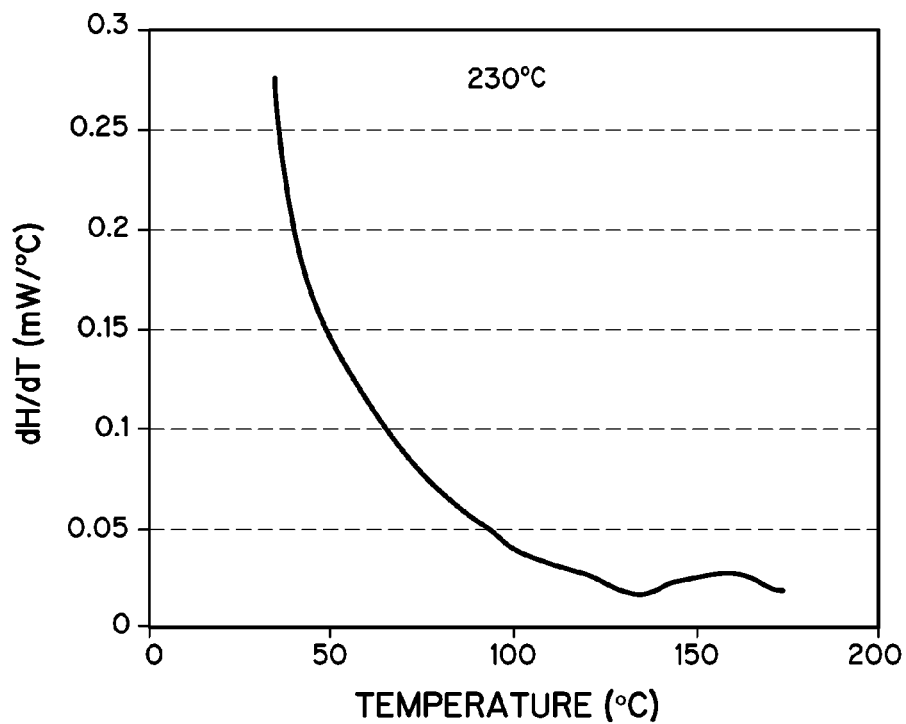
Figure 10D:
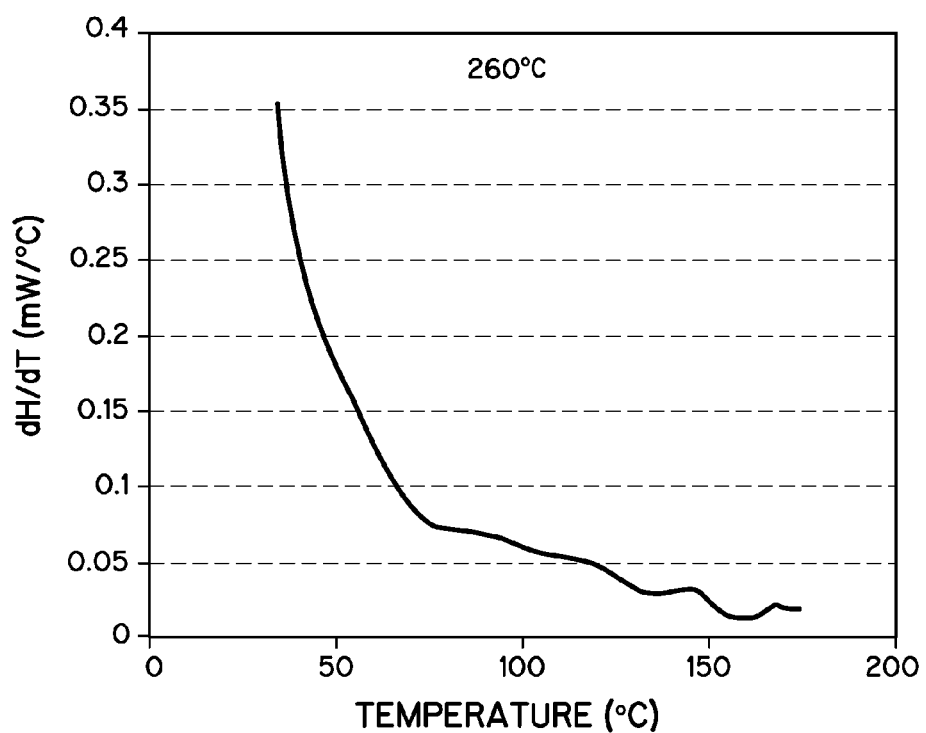

The derivative of heat flow over temperature was plotted with temperature in FIG. 10A for the raw biomass as well as biochar pretreated at different temperatures (FIGS. 10B, 10C, and 10D). The derivative followed the same trend for all cases and decreased with the increase in temperature. At a temperature of 135° C., the slope started increasing with increasing temperature until 165° C., then it followed the same trend again. The change pattern of heat flow derivative in the range of 135° C.-165° C. indicates the glass transition behavior of the lignin. At the glass transition region, the semi-crystalline solids start vibrating in their own region but do not undergo segmental motion, which explains the different pattern of heat flow noticed in the DSC curve at the glass transition region. From FIGS. 10A-10D, it was also observed that the deviation of the derivative was larger for biochar pretreated at higher temperatures than the raw biomass. That may be the indication of the higher concentration of lignin in the biochar, which increased with at the highest pretreatment temperature, 260° C.

The range of glass transition temperatures observed ensures that the inventive process preserved lignin from the raw biomass in the biochar prepared at a temperature of up to 260° C. Zhang et al., reported that lignin remains relatively inert over these the same temperatures during hydrothermal pretreatment (Reaction Kinetics of the Hydrothermal Treatment of Lignin. *Appl. Biochem Bioethanol.* 2008, 147, 119-131). Only at temperatures above 300° C. was rapid degradation of lignin observed in hot water. Extrapolating their data to a lower temperature of 260° C., more than 3 hours is required to observe degradation of lignin. This range of glass transition behavior verifies that the lignin content of the biochar can function as a binder during pelletization temperature of 140° C. At this temperature, the lignin can act as a binder because it will be softened by applying this temperature and with compression it can bind other particles. The more lignin in the biomass, the better will be the binding under the stated conditions.

Mass and Energy Density of Pretreated Biomass Pellets

The density of raw lignocellulosic biomass hinders commercializing the processing of biofuel from it. The relatively high 0/C ratio and H/C ratio results in lowering the heating value of the biomass. With loblolly pine, the biochar processed at 260° C. loses up to 43% of its mass, while energy densification increases up to 1.3 (on a mass basis) compared to raw pine. The pelletization of pretreated biomass makes the biomass more dense, uniform in size, and easier to handle than untreated biomass and biochar that has not been pelletized.

Figure 11:
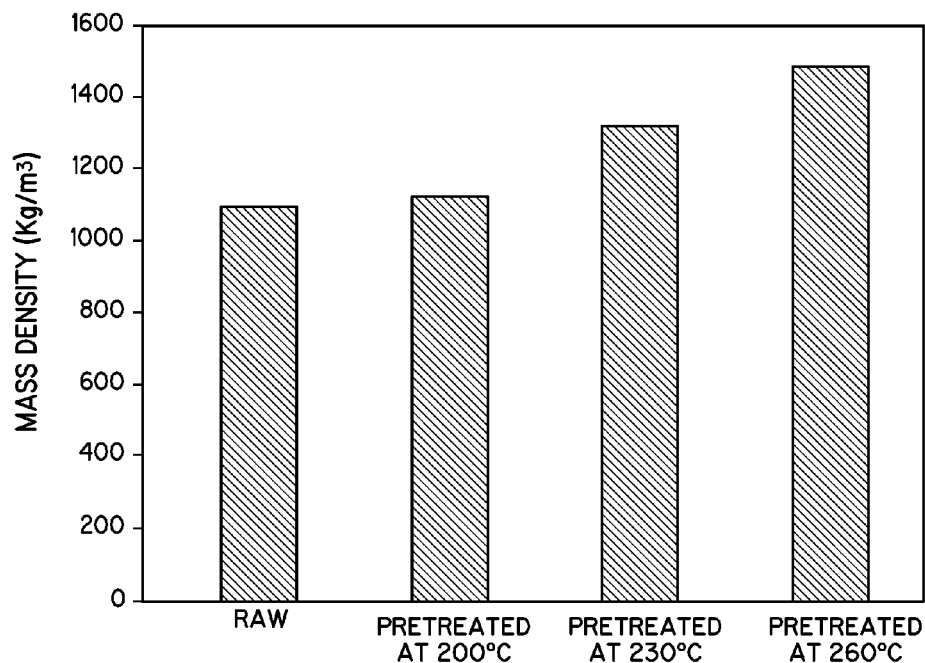
FIG. 11 is a graph illustrating the mass density of the pellets of raw loblolly pine and wet torrefaction biochar pretreated at different temperatures in accordance with embodiments of the invention.

FIG. 11 and Table 3 show that pellets from raw loblolly pine have a mass density of 1102.8 kg/m$^3$, while raw loblolly pine that has not been formed into pellets has a density of 813 kg/m$^3$. Theerarattananoon et al., made pellets of wheat straw, big bluestem, corn stover, and sorghum stalk (Physical properties of pellets made from sorghum stalk, corn stover, wheat straw, and big bluestem. *Industrial Crops and Products.* 2011, 33, 325-332). The true density of wheat straw is 699.8 kg/m$^3$, but after the pelletization they reported a density of 852.0 kg/m$^3$. Like the wheat straw other biomasses are densified with pelletization. Gilbert et al., made pellets of cut, shredded, and torrefied switch grass. The raw switch grass has a density of 150-200 kg/m$^3$ but with pelletization at 55.2 MPa at room temperature the density increases to 720 kg/m$^3$ (Effect of process parameters on pelletisation of herbaceous crops. *Fuel.* 2008, 88. 1491-1497).

TABLE 3

Mass and energy density of loblolly pine wood, pellets of raw loblolly pine, pellets pretreated at 200° C. (HTC-200), 230° C. (HTC-230), and 260° C. (HTC-260).

|  | Mass Density (kg/m$^3$) | HHV (MJ/kg) | Energy density (GJ/m$^3$) |
| --- | --- | --- | --- |
| Wood | 813 | 19.65 | 15.97 |
| Raw Pellet | 1102.4 | 20.65 | 22.76 |
| HTC-200 pellet | 1125.8 | 21.59 | 24.31 |
| HTC-230 pellet | 1331.5 | 22.56 | 30.04 |
| HTC-260 pellet | 1468.2 | 26.42 | 38.79 |

In the case of pretreated biomass pellets, FIG. 11 shows that with increasing hydrothermal carbonization temperature the pellet density increases. Pellets of loblolly pine pretreated at 260° C. have a mass density of 1462.8 kg/m$^3$, which was 32.6% higher than the pellets of loblolly pine pretreated at 200° C. and 80% higher than that of pellets made from raw loblolly pine wood. Yan et al., reported that the product of hydrothermally carbonized lignocellulosic biomass was more friable with increasing pretreatment temperature and it becomes more hydrophobic (Thermal Pretreatment of Lignocellulosic Biomass. *Environ. Prog. Sustainable Energy* 2009, 28, 435).

Nielson et al., reported that biomass with extractives requires more pressure for pelletization, which likely means the extractives were hard to compress (Effect of Extractives and Storage on the Pelletizing Process of Sawdust. *Fuel.* 2010, 89. 94-98). Torrefaction of biomass causes the degradation of extractives even at 200° C. and which may cause the torrefied biomass pellets to be denser than raw biomass pellets.

The higher heating value (HHV) was almost the same for untreated biomass and untreated pellets or biochar and biochar pellets. Table 3 shows the HHV of biomass and pellets. The HHV for the biomass and biochar pellets were similar to the HHV of the biomass and biochar that had not been formed into pellets as reported by Yan et al. (Thermal Pretreatment of Lignocellulosic Biomass. *Environ. Prog. Sustaintable Energy* 2009, 28, 435). That implies that the chemical compositions remain same through the pelletization process. The materials were compressed, without chemical reaction. There was no external binder used for pelletization of biochar prepared with the inventive process. Hemicelluloses and water solubles in the lignocellulosic biomass starts reaction from about 180° C., so by applying about 140° C. pelletizing temperature probably did not change composition of the biomass through pelletization.

But in terms of energy density, as the mass density of pellets increases rapidly and the HHV remains same, the energy density increases rapidly. Table 3 shows the energy densities of the pellets of pretreated loblolly pine. Pellets of pretreated loblolly pine at 260° C. have an energy density of 38.79 GJ/m$^3$ which is 70% higher than raw loblolly pellets and 142% higher than raw loblolly wood.

Mechanical Strength of Pretreated Biomass Pellets

The main purpose of the mechanical strength testing of the pellets is to ensure their durability under adverse conditions. Compressive strength, tensile strength, abrasion index, and Young's modulus can all be used to determine the mechanical strength of pellets. The abrasion index, compressive strength, and modulus of elasticity were measured to characterize the mechanical properties of the pellets.

Abrasion Index of Pellets Made from Pretreated Loblolly Pine

Figure 12:
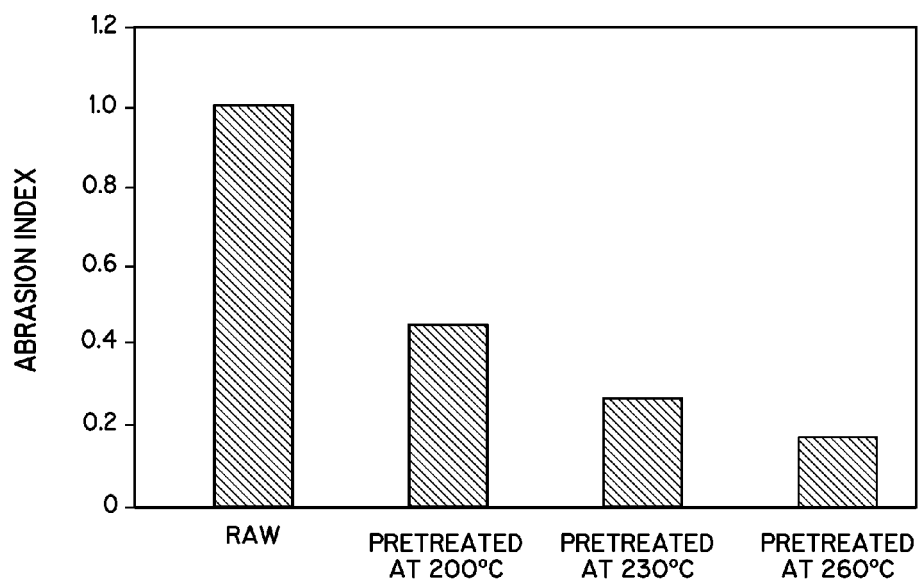
FIG. 12 is a graph illustrating the abrasion index of the pellets of raw loblolly pine and wet torrefaction biochar pretreated at different temperatures in accordance with embodiments of the invention.

Table 4 and FIG. 12 show the abrasion index of the pellets of raw loblolly pine as well as pretreated loblolly pine torrefied at different temperatures. The raw loblolly pine had an abrasion index of 1% where the pretreated loblolly pine had a lower abrasion index with the increase of torrefaction temperature.

TABLE 4

Abrasion index and durability of pellets of loblolly pine and HTC biochar pretreated at different temperatures.

| Pretreated temperature (° C.) | Abrasion Index (%) | Durability (%) |
| --- | --- | --- |
| raw | 1.03 | 0.981 |
| 200 | 0.47 | 0.995 |
| 230 | 0.28 | 0.997 |
| 260 | 0.18 | 0.998 |

The pellets of pretreated loblolly pine at 260° C. have an abrasion index of only 0.18% which is around 5 times lower than the raw biomass pellet. Gil et al., measured the abrasion index for pine sawdust pellet as 12% (Mechanical Durability and Combustion Characteristics of pellets from Biomass Blends. *Bioresource Technology.* 2010, 101. 8859-8867). The difference may be due to the dimensional difference of the drum as well as the rotation speed. The screen size was different between the two cases. The dimension was not complete for their pellets. Moreover, the temperature and pressure was not recorded in their pelletization. It is reasonable to assume that they made their pellets at room temperature and not high pressure, which may be the reason their abrasion index was 10 times higher than those reported in table 4. Also, pine sawdust was not loblolly pine, another reason for showing some difference.

Theerarattananoon et al., reported the durability of wheat straw pellets, big bluestem pellets, corn stover pellets, and sorghum pellets using a tumbler (Physical properties of pellets made from sorghum stalk, corn stover, wheat straw, and big bluestem. *Industrial Crops and Products.* 2011, 33. 325-332). They charged 100 g of samples and rotated 500 times and then sieved in 3.36 mm. Durability of pellets was defined as the ratio of mass of pellets after tumbling with the mass of pellets initially. They reported durability of 98.3%, 97.6%, 97.9% and 93.5% for wheat straw pellets, big bluestem pellets, corn stover pellets, and sorghum pellets, respectively. In the present example, the durability of pellets made from raw loblolly pine was 98.97% and increased with higher reaction temperature for pretreated pellets.

In the case of pellets of biochar, the abrasion index decreased with the increase of pretreatment temperature, when all the other variables were the same (Table 4). The lower abrasion index and higher durability mean the pellets were mechanically more stable. As lignin was inert in the temperature range of 200° C.-260° C., the lignin percentage increased in the biochar with pretreatment temperature using the same reaction time. Yan et al., reported that the lignin percentage of biochar pretreated at 260° C. was 35%, while it was 25% in the raw biomass (Thermal Pretreatment of Lignocellulosic Biomass. *Environ. Prog. Sustainable Energy* 2009, 28, 435). Applying the temperature of 140° C. in pelletization makes the lignin show its glass transition behavior and the high pressure ensures good contact of particles, while residual moisture enhances the binding ability. All these criteria make the pellets more mechanically strong, which were reflected in their abrasion index and durability.

Compressive Strength of Pretreated Biomass Pellets

Compressive strength measurement is another test of mechanical stability for the pellets. It tells how much load a pellet can sustain. The abrasion index tells how much shaking or jerking the pellets can handle, while compressive strength determines how much load the pellets can carry without any deterioration. Modulus of elasticity is a parameter that establishes how high a load is needed to deform a unit length. It basically shows how much pellets can be squeezed by the applied pressure before they break.

Ultimate compressive strength is the maximum strength that a pellet can sustain without any crack or breakage. As shown in Table 5, it was found that the ultimate compression strength of the pellets decreased with increasing torrefaction temperature. This behavior may be due to the friable behavior of biochar. With an increase in wet torrefaction temperature, the biochar becomes more friable and hydrophobic. The fracture was observed by the naked eye, so the detection of fracture with pressure might be varied from different circumstances.

TABLE 5

Ultimate compressive strength and modulus of elasticity of HTC biochar pellets.

| Pretreatment Temp (° C.) | Ultimate strength (MPa) | Modulus of Elasticity (kN/mm) |
| --- | --- | --- |
| Raw | 200 | 4.0 |
| 200 | 180 | 5.0 |
| 230 | 150 | 10.0 |
| 260 | 100 | 11.11 |

Again, the lignin percentage of the pretreated biomass increased with an increase of torrefaction temperature. Lignin softens at the temperature of 140° C. and, with compression, it binds the particles. By cooling the pellets, lignin hardens again resulting in an increase of pellet strength. More lignin can make the pellets hard and brittle. In this condition, the pellets act like a glass. FIG. 12 shows the modulus of elasticity of pellets made from raw pine or made with biochar from the inventive process at 200° C., 230° C., and 260° C.

Figure 13A:
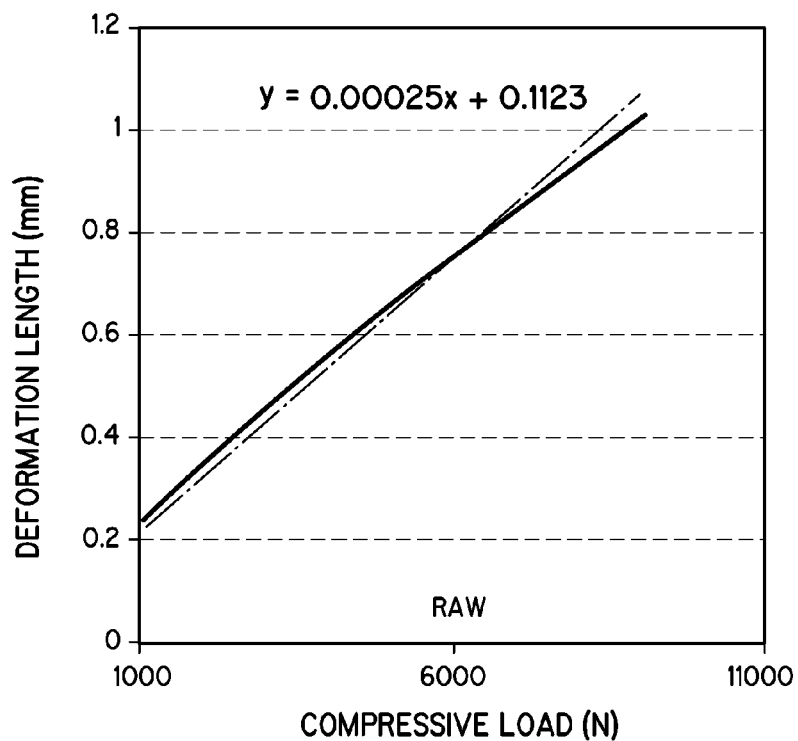
FIG. 13A is a graph illustrating the determination of modulus of elasticity of raw loblolly pine pellets in accordance with embodiments of the invention.
Figure 13B:
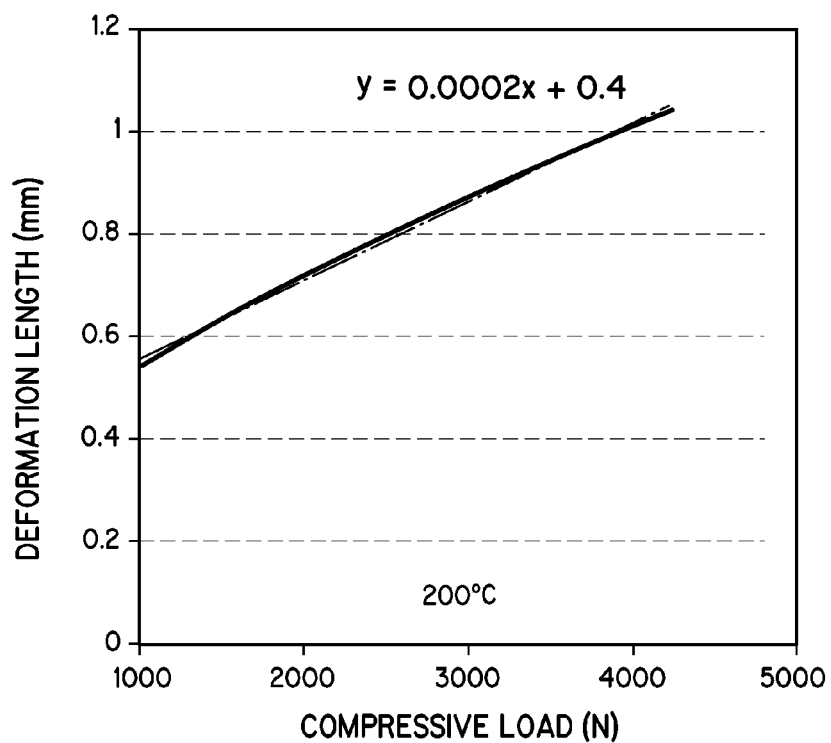
FIGS. 13B-13D is a graph illustrating the determination of modulus of elasticity of wet torrefaction biochar pellets in accordance with embodiments of the invention.
Figure 13C:
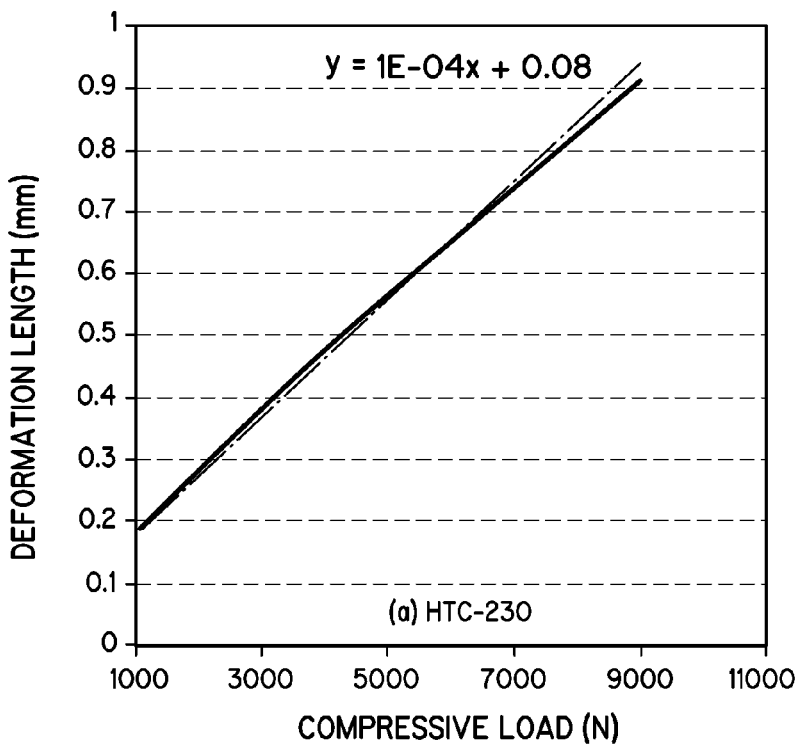
Figure 13D:
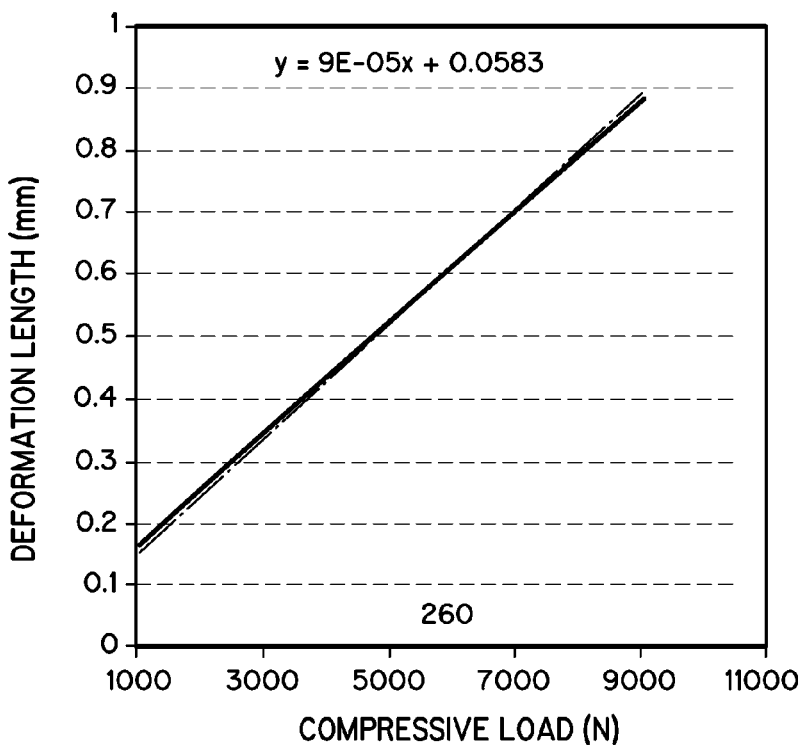

FIGS. 13A-D show the deformation length under compressive load of pellets made from raw pine (FIG. 13A) or made with biochar from the inventive process at 200° C. (FIG. 13B), 230° C. (FIG. 13C), and 260° C. (FIG. 13D). The longitudinal deformation linearly increased with compression for all cases. The intercept of these lines are not zero, and the slope of the line changing in every case. The slope of the line was the modulus of elasticity as it tells about the amount of load needed to deform one mm of the pellet. The minimum compressive load reported was 1000 N because of the machine precision.

Pellets made from biochar treated with in the inventive process at 260° C. (FIG. 13D) pellets have a modulus of elasticity higher than the other pellets. That means, the deformation from applying the load is very low and it requires a certain load to break it. Due to a lower lignin concentration in biochar pretreated at lower temperature, the modulus of elasticity is lower and the pellets require more compressive strength before breaking.

Equilibrium Moisture Content of Pretreated Biomass Pellets

Equilibrium moisture content (EMC) is defined as the moisture content in the biomass which is in thermodynamic equilibrium with the moisture in the surrounding atmosphere at a given relative humidity, temperature, and pressure. Moisture plays an important role on the properties and behavior of any biologically derived material. The biodegradation of biomass depends heavily on the moisture content of the biomass. The moisture content of the biomass largely depends on the atmosphere but it also depends on the composition of the biomass. EMC is used in this case as an indirect measure of substrate hydrophilicity.

Wet torrefaction of lignocellulosic biomass makes the biochar hydrophobic and it becomes more hydrophobic with the increase of torrefaction temperature at the same reaction time. The mechanical strength of pellets can be varied with the moisture content. If a pellet of raw biomass is immersed in the water, it takes not more than 15 s to fall apart. In contrast, it takes about 2 weeks of soaking in water to create a fracture in the pellet from biochar treated at 260° C. There was no sign of the pellet for raw biomass after immersing in water for 15 s, so it loses all its mechanical strength after 15 s, mainly because of hydrophilic behavior. But the biochar is hydrophobic, so it retains its shape and mechanical strength better than raw biomass pellets. In other cases, a lower moisture content was required to prevent the pellets from biodegradation as well as to increase the heating value.

The same method was applied to measure the EMC of pellets of biochar to find out the effect of pelletization on EMC of pretreated biomass. The results of EMC of biochar and its pellets are shown in Table 6. It is found that the EMC of pellets was in the same range as the EMC of pretreated biomass. So, the pelletization process did not affect the EMC.

TABLE 6

EMC of the biochar pellets at different relative humidities.

| Pretreatment | Treatment temperature (° C.) | EMC(%) at $H_R = 11.3\%$ HTC Pellets | EMC(%) at $H_R = 11.3\%$ HTC Biomass | EMC(%) at $H_R = 83.6\%$ HTC Pellets | EMC(%) at $H_R = 83.6\%$ HTC Biomass | EMC(%) at $H_R = 100\%$ HTC Pellets |
|---|---|---|---|---|---|---|
| Raw | — | 2.63 | 3.5 ± 0.5 | 17.67 | 15.6 ± 0.9 | 29.85 |
| HTC | 200 | 1.53 | 1.8 ± 0.5 | 12.39 | 12.8 ± 0.7 | 27.36 |
|  | 230 | 1.04 | 0.9 ± 0.3 | 8.63 | 8.2 ± 0.7 | 12.67 |
|  | 260 | 0.66 | 0.4 ± 0.3 | 4.69 | 5.3 ± 0.03 | 7.08 |

Acharjee, reported the EMC achieved after 12-15 days but here the EMC was achieved after 15-25 days (Thermal Pretreatment Options for Lignocellulosic Biomass. *MS Thesis. University of Nevada.* 2010). Raw pellet reached equilibrium faster than biochar pellets. This may be because the mass density was lower in the raw pellets than the biochar. While the biochar reached equilibrium in 12-15 days, the raw biomass pellets reached equilibrium after 15 days. The presence of fungi was observed after 17-18 days in the raw biomass pellet and after 20-21 days for the pellets of biochar pretreated at 200° C. Fungus has its own EMC distinct from biomass, and its growth may affect the structure of HTC biochar or woody biomass. So, it was not worthwhile to measure the EMC after it starts molding. But no fungi were observed in the other pellets even after 25 days.

Conclusions

Wet torrefaction is a promising process for upgrading the mass and energy density of lignocellulosic biomass. Making pellets from the biomass always increases the mass density. The volumetric fuel density of pellets produced from biochar is as much as 142% more than that of raw biomass. Lignin is a natural binder in the lignocellulosic biomass and the inventive process does not affect the nature of lignin in the biochar. Lignin shows glass transition behavior in the temperature range of 135-165° C. The pellets made from biochar have higher mass and energy density compared to raw biomass. With the pelletization temperature above the glass transition temperature, mechanically durable pellets can be made. Abrasion index and durability improves with the increase of the inventive wet torrefaction temperature. The modulus of elasticity is higher for the biochar pellets pretreated at higher temperature. The ultimate breaking strength is decreased with the increase of inventive wet torrefaction temperature for the pellets. Equilibrium moisture content is in the same range for biomass and pellets, but it takes a longer time to reach the equilibrium for the pellets than the biomass. EMC of pellets produced from biochar is much lower than the EMC of pellets made from raw biomass, indicating hydrophobic behavior of the inventive process.

What is claimed is:

1. A process for wet torrefaction of a wet biomass into a liquid fuel or gas product utilizing a two chamber reactor wherein the two chamber reactor comprises a loading chamber and a reaction chamber containing water, the process comprising:
   a) loading the wet biomass into the loading chamber, wherein the loading chamber is designed to be sealed and pressurized and is maintained between about 25° C. and about 180° C. and wherein, the wet biomass is plant material;
   b) sealing the loading chamber to maintain wet biomass;
   c) prior to introducing the wet biomass into the reaction chamber containing water, increasing temperature to about 275° C., and increasing pressure sufficient to maintain water in liquid state within the reaction chamber so that the reaction temperature is maintained at about 260° C. thereby increasing the energy density of a reacted biomass by at least about 40%;
   d) introducing the wet biomass into the reaction chamber containing water such that the desired reaction temperature is maintained at about 260° C. or equilibrates thereto; e) quenching the reaction within the reaction chamber wherein the reacted biomass temperature is lowered below 180° C. so that total time from step d) and e) is for the wet biomass being introduced into the reaction chamber, maintained in the reaction chamber at about 260° C. to the wet biomass being quenched below 180° C. is less than five minutes; wherein being subjected to the reaction condition increases the energy density of the reacted biomass by at least about 40% relative to the wet biomass prior to wet torrefaction; and f) forming the reacted biomass with an increased energy density of at least 40% into a liquid fuel or gas product.

2. The process of claim 1 further comprising subjecting the wet biomass to the desired reaction condition for an amount of time effective to increase the natural binder concentration of the reacted biomass relative to the biomass prior to reaction.

3. The process of claim 2 wherein the natural binder is lignin or a derivative of lignin.

4. The process of claim 1 wherein the plant material is loblolly pine.

5. The process of claim 4 wherein the wet biomass total time is about 60 seconds.

6. A process for wet torrefaction utilizing a two chamber reactor wherein the two chamber reactor comprises a loading chamber and a reaction chamber containing water, the process comprising:
   a) loading a biomass into the loading chamber, wherein the loading chamber is designed to be sealed and pressurized and is maintained between about 25° C. and about 180° C., wherein the biomass is plant material;
   b) sealing the loading chamber to minimize pressure loss in the reaction chamber during wet torrefaction;
   c) prior to introducing biomass into the reaction chamber containing water, increasing temperature and increasing pressure within the reaction chamber to at or above a desired reaction temperature and a pressure sufficient to maintain water in a liquid state wherein the desired reaction temperature comprises a temperature includes a temperature in a range between about 230° C. and about 260° C. and is sufficient to increase the energy density of a reacted biomass by at least 25%;
   d) introducing biomass into the reaction chamber containing water, such that the desired reaction temperature of between about 230° C. and about 260° C. is maintained or equilibrates thereto;
   e) subjecting biomass to the desired reaction temperature, wherein the desired reaction temperature includes a temperature in a range between about 230° C. and about 260° C. and compressed water in an inert atmosphere thereby forming a reacted biomass with a water to biomass ratio of between about 5:1 w/w to about 75:1 w/w, and an energy density increased by at least about 25% of the reacted biomass relative to the biomass prior to wet torrefaction; and
   f) quenching the reaction occurring in the reaction chamber wherein biomass temperature is lowered below 180° C. so that total time between steps d)-f) is for the biomass being introduced into the reaction chamber, maintained in the reaction chamber between about 230° C. and about 260° C. to the biomass being quenched below 180° C. is less than five minutes and allows energy density of the reacted biomass to be increased by at least about 25% relative to biomass prior to wet torrefaction.

7. The process of claim 6 wherein the temperature of the desired reaction temperature is about 260° C.

8. The process of claim 6 wherein the amount of total time is about 60 seconds.

9. The process of claim 1 wherein the wet biomass is cellulosic.

10. The process of claim 6 wherein the biomass is subjected to the desired reaction temperature for less than two minutes.

11. The process of claim 6 further comprising subjecting the biomass to the desired reaction condition for an amount of time effective to increase the natural binder concentration of the reacted biomass relative to the biomass prior to reaction.

12. The process of claim 6 further comprising forming the reacted biomass into at least one of a solid fuel, a liquid fuel, or a gas product.

13. The process of claim 6 further comprising applying pressure to the reacted biomass in an amount sufficient to form a pellet.

14. The process of claim 1 wherein the plant material comprises cellulose, hemi-cellulose, lignin or a combination thereof.

15. The process of claim 6 wherein the plant material comprises cellulose, hemi-cellulose, lignin or a combination thereof.

16. The process of claim 13 wherein the biomass contains lignin and the reacted biomass has a greater concentration of lignin than prior to treatment and is sufficient to form a pellet from the reacted biomass without addition of exogenous binders.

17. The process of claim 1, wherein the plant material is rice husks or corn stover.

18. The process of claim 6, wherein the plant material is loblolly pine.

19. The process of claim 18, wherein the desired reaction temperature is about 260° C.

* * * * *